US011212886B1

(12) United States Patent
Fu et al.

(10) Patent No.: US 11,212,886 B1
(45) Date of Patent: *Dec. 28, 2021

(54) UNIVERSAL PLATE ADAPTER

(71) Applicant: Kuna Systems Corporation, San Bruno, CA (US)

(72) Inventors: Sai-Wai Fu, Los Altos Hills, CA (US); Haomiao Huang, Redwood City, CA (US); Harold G. Sampson, Sunnyvale, CA (US)

(73) Assignee: KUNA SYSTEMS CORPORATION, San Bruno, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/026,647

(22) Filed: Sep. 21, 2020

Related U.S. Application Data

(63) Continuation of application No. 16/682,518, filed on Nov. 13, 2019, now Pat. No. 10,827,574, which is a (Continued)

(51) Int. Cl.
H05B 45/10 (2020.01)
F21S 8/04 (2006.01)
(Continued)

(52) U.S. Cl.
CPC ............ H05B 45/10 (2020.01); F21S 8/033 (2013.01); F21S 8/04 (2013.01); G06K 9/00912 (2013.01);
(Continued)

(58) Field of Classification Search
CPC ...... H05B 45/10; H05B 47/105; H05B 47/19; H05B 47/16; F21S 8/04; F21S 8/033; G06K 9/00912; G06K 9/00288; H04W 4/02; H04N 5/23229; H04N 5/247; H04N 7/183; H04N 7/18; H04N 5/23219; G08B 13/196;
(Continued)

(56) References Cited

U.S. PATENT DOCUMENTS

2003/0197807 A1* 10/2003 Wu ................. H04N 5/2256 348/375
2003/0210340 A1* 11/2003 Frederick Romanowich ............ H04N 5/2256 348/272
(Continued)

Primary Examiner — Gevell V Selby
(74) Attorney, Agent, or Firm — Christopher P. Maiorana, PC

(57) ABSTRACT

An apparatus includes a power adapter, a security camera and a base. The power adapter may be configured to receive an AC power source, pass through the AC power source to a light bulb and generate DC power by converting the AC power source. The security camera may be configured to receive the DC power from the power adapter. The security camera may comprise a camera module. The base may comprise an opening for a light fixture and an attachment location. The power adapter may be electrically connected to the attachment location. The power adapter may receive the AC power source from an electrical connection for the light fixture. The security camera may be configured to receive the DC power from the power adapter. The security camera may be removably attached to the attachment location. The camera module may be located beyond a front face of the light fixture.

20 Claims, 16 Drawing Sheets

Related U.S. Application Data continuation-in-part of application No. 16/585,342, filed on Sep. 27, 2019, now Pat. No. 10,887,958, which is a continuation-in-part of application No. 16/514,359, filed on Jul. 17, 2019, now abandoned, which is a continuation-in-part of application No. 16/252,841, filed on Jan. 21, 2019, now Pat. No. 10,555,393, which is a continuation of application No. 15/899,007, filed on Feb. 19, 2018, now Pat. No. 10,212,778, which is a continuation of application No. 15/611,975, filed on Jun. 2, 2017, now Pat. No. 10,117,309, which is a continuation of application No. 15/214,866, filed on Jul. 20, 2016, now Pat. No. 9,992,389.

(60) Provisional application No. 62/807,996, filed on Feb. 20, 2019, provisional application No. 62/798,582, filed on Jan. 30, 2019, provisional application No. 62/794,022, filed on Jan. 18, 2019, provisional application No. 62/754,161, filed on Nov. 1, 2018, provisional application No. 62/700,452, filed on Jul. 19, 2018, provisional application No. 62/197,322, filed on Jul. 27, 2015.

(51) Int. Cl.
| | |
|---|---|
| *H05B 47/105* | (2020.01) |
| *G06K 9/00* | (2006.01) |
| *H05B 47/19* | (2020.01) |
| *H04N 7/18* | (2006.01) |
| *H04N 5/232* | (2006.01) |
| *G08B 3/00* | (2006.01) |
| *G08B 13/196* | (2006.01) |
| *H05B 47/16* | (2020.01) |
| *F21S 8/00* | (2006.01) |
| *H04W 4/02* | (2018.01) |
| *H04N 5/247* | (2006.01) |
| *F21W 131/107* | (2006.01) |
| *F21Y 101/00* | (2016.01) |

(52) U.S. Cl.
CPC ............ *G08B 3/00* (2013.01); *G08B 13/196* (2013.01); *H04N 5/23229* (2013.01); *H04N 5/247* (2013.01); *H04N 7/18* (2013.01); *H04N 7/183* (2013.01); *H04W 4/02* (2013.01); *H05B 47/105* (2020.01); *H05B 47/16* (2020.01); *H05B 47/19* (2020.01); *F21W 2131/107* (2013.01); *F21Y 2101/00* (2013.01); *G06K 9/00288* (2013.01); *H04N 5/23219* (2013.01)

(58) Field of Classification Search
CPC .. G08B 3/00; F21W 2131/107; F21Y 2101/00
See application file for complete search history.

(56) References Cited

U.S. PATENT DOCUMENTS

| | | | | |
|---|---|---|---|---|
| 2006/0044789 | A1* | 3/2006 | Curtis | F21V 21/12 362/152 |
| 2010/0141153 | A1* | 6/2010 | Recker | H05B 47/115 315/149 |
| 2013/0021795 | A1* | 1/2013 | Chien | H04N 5/2252 362/235 |
| 2018/0035084 | A1* | 2/2018 | Swiss | H04N 7/185 |

* cited by examiner

US 11,212,886 B1

UNIVERSAL PLATE ADAPTER

This application relates to U.S. Ser. No. 16/682,518, filed Nov. 13, 2019, which relates to U.S. Provisional Application No. 62/794,022, filed Jan. 18, 2019. This application relates to U.S. Provisional Application No. 62/798,582, filed Jan. 30, 2019. This application relates to U.S. Provisional Application No. 62/807,996, filed Feb. 20, 2019. This application relates to U.S. Ser. No. 16/585,342, filed Sep. 27, 2019, which relates to U.S. Ser. No. 16/514,359, filed Jul. 17, 2019, which relates to U.S. Ser. No. 16/252,841, filed Jan. 21, 2019, which relates to U.S. Ser. No. 15/899,007, filed Feb. 19, 2018, now U.S. Pat. No. 10,212,778, which relates to U.S. Ser. No. 15/611,975, filed Jun. 2, 2017, now U.S. Pat. No. 10,117,309, which relates to U.S. Ser. No. 15/214,866, filed Jul. 20, 2016, now U.S. Pat. No. 9,992,389, which relates to U.S. Provisional Application No. 62/197,322, filed Jul. 27, 2015. U.S. Ser. No. 16/514,359, filed Jul. 17, 2019 also relates to U.S. Provisional Application No. 62/700,452, filed Jul. 19, 2018. U.S. Ser. No. 16/585,342, filed Jul. 17, 2019 also relates to U.S. Provisional Application No. 62/754,161, filed Nov. 1, 2018. Each of the mentioned applications are hereby incorporated by reference in its entirety.

FIELD OF THE INVENTION

The invention relates to security cameras generally and, more particularly, to a method and/or apparatus for implementing a universal plate adapter.

BACKGROUND

Light sources can cause undesirable glare in captured video frames. A camera built into a conventional light fixture has a fixed location. However, a fixed location for a camera might not provide a desirable field of view.

Cameras recording video near entrances to homes and businesses are a popular new product. Integrating cameras into light fixtures and doorbells is convenient for access to already available power supplies. However, integrating cameras into light fixtures forces home owners to replace existing light fixtures. Developers of integrated cameras for light fixtures can only make a limited number of designs. Many homeowners prefer the design and aesthetics of the light fixtures already installed on the home. Homeowners would like to have the functionality of a security camera at home entrances, while still using the light fixtures they already have.

It would be desirable to implement universal plate adapter.

SUMMARY

The invention concerns an apparatus comprising a power adapter, a security camera portion and a base. The power adapter may be configured to receive an AC power source, pass through the AC power source to a light bulb and generate DC power by converting the AC power source. The security camera portion may be configured to receive the DC power from the power adapter. The security camera portion may comprise a camera module. The base may comprise an opening for a light fixture and an attachment location. The power adapter may be electrically connected to the attachment location. The power adapter may receive the AC power source from an electrical connection for the light fixture. The security camera portion may be configured to receive the DC power from the power adapter. The security camera portion may be removably attached to the attachment location. The camera module may be located beyond a front face of the light fixture.

BRIEF DESCRIPTION OF THE FIGURES

Embodiments of the invention will be apparent from the following detailed description and the appended claims and drawings.

DETAILED DESCRIPTION OF THE EMBODIMENTS

Embodiments of the present invention include providing a universal plate adapter that may (i) provide a connection to a security camera, (ii) enable a security camera to be mounted on either side of a light sconce, (iii) generate DC power for a security camera and provide AC power for a light bulb, (iv) prevent glare in captured video data, (v) prevent a light sconce from obstructing a view of a security camera and/or (vi) be implemented as one or more integrated circuits.

A light sconce and/or light fixture is generally installed 2 to 3 feet from a door of a home. Embodiments of the invention may comprise a security camera that may be installed near the light sconce. Power supplied by the premises to power the light fixture may be converted to provide power for the components of the security camera. Embodiments of the invention may prevent the light sconce from blocking the field of view of a camera. Embodiments of the invention may further prevent light emitted from the light sconce from creating a halo effect (e.g., glare) in captured video frames.

Embodiments of the present invention may be configured to enable a homeowner to install a camera module while keeping an already installed light fixture. Since light fixtures have many different shapes, sizes and designs, embodiments of the invention may be configured to accommodate the various shapes, sizes and designs. By accommodating the various shapes, sizes and designs, embodiments of the present invention may enable video to be captured with a field of view that is not obstructed by a light sconce/lamp shade by installing a camera module to a pre-existing light fixture. By using an embodiment of the present invention, homeowners may add video recording/streaming functionality to entrances of the home without buying a new light fixture that has a different design.

Figure 1:
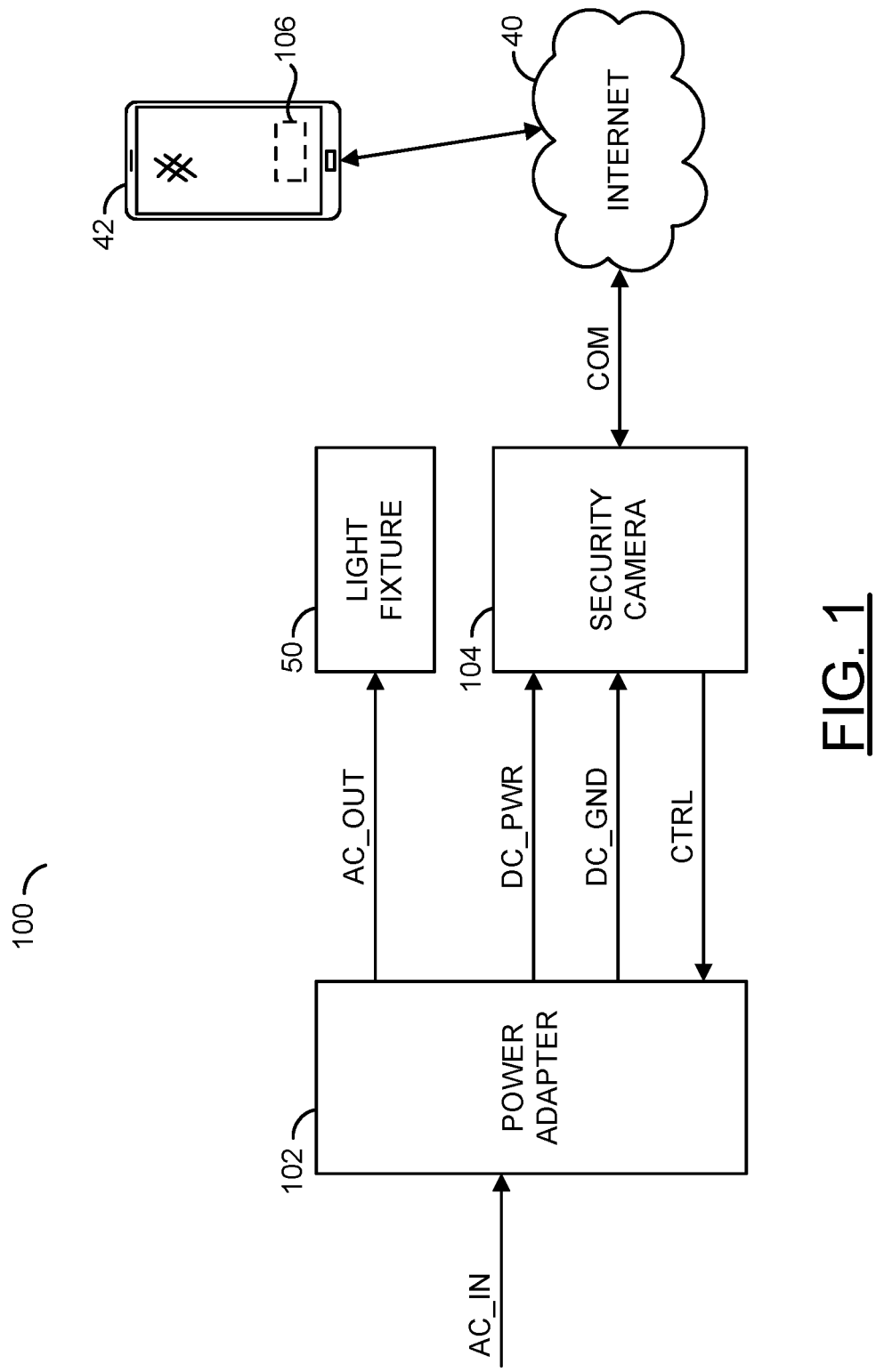
FIG. 1 is a diagram illustrating a block diagram of an example embodiment of the present invention.

Referring to FIG. 1, a diagram illustrating a block diagram of an example embodiment of the present invention is shown. A block (or circuit) 50 is shown. The block 50 may be a light fixture. The light fixture 50 may be a pre-existing/pre-installed device. In an example, the light fixture 50 may be a lamp installed near an entrance to a home.

An apparatus 100 is shown comprising a block (or circuit) 102 and/or a block (or circuit) 104. The apparatus 100 may be connected to the light fixture 50. The circuit 102 may implement a power adapter. The circuit 104 may implement a security camera. The apparatus 100 may comprise other components (not shown). The number, type and/or arrangement of the components of the apparatus 100 may be varied according to the design criteria of a particular implementation.

The power adapter may receive a signal (e.g., AC_IN) and/or a signal (e.g., CTRL). The signal AC_IN may be an AC power supply input from the electrical supply of the premises. The signal CTRL may be a control signal. The power adapter may present a signal (e.g., AC_OUT), a signal (e.g., DC_PWR) and/or a signal (e.g., DC_GND). The signal AC_OUT may be an AC power output. The signal DC_PWR may be a DC power output. The signal DC_GND may be a DC ground. The power adapter may receive and/or generate other signals (not shown). The number and/or types of signals generated and/or received by the power adapter 102 may be varied according to the design criteria of a particular implementation.

The power adapter 102 may provide the AC power to the light fixture 50 (e.g., to provide power to a light bulb). The power adapter 102 may receive the AC input signal AC_IN and pass through the AC input as the AC output AC_OUT. The signal AC_IN may be provided by an electrical connection for the light fixture 50 (e.g., a junction box). For example, the power adapter 102 may be configured to receive the AC power (e.g., the signal AC_IN) from a junction box and pass through AC power (e.g., the signal AC_OUT) while converting the AC input to a DC power supply.

The power adapter 102 may convert the AC power to a DC power supply. The power adapter 102 may provide the DC power signal DC_PWR and the DC ground signal DC_GND to the security camera 104. The DC power may be provided to power the components of the security camera 104. For example, the power adapter 102 may provide a power and ground supply to the security camera 104.

The security camera 104 may be configured to generate the signal CTRL. The signal CTRL may be provided to the power adapter 102. The signal CTRL may be configured to control the light fixture 50. The power adapter 102 may be configured to generate the signal AC_OUT in response to the signal CTRL. In an example, the power adapter 102 may be configured to turn on/off a light bulb implemented by the light fixture 50 in response to the signal CTRL. The security camera 104 may perform computer readable instructions to perform various operations. The various operations and/or functionality may be used to determine whether to turn on/off the light bulb implemented by the light fixture 50. In an example, the power adapter 102 may not provide the signal AC_OUT so that the light bulb is turned off. Then the security camera 104 may perform calculations and/or comparisons and determine that the light bulb should be turned on. The security camera 104 may assert the signal CTRL. In response to the signal CTRL, the power adapter may provide the signal AC_OUT to the light fixture 50.

The power adapter 102 may provide the AC power to the light fixture 50 while providing the DC power supply to the security camera 104. By providing both the AC power and the DC power, the apparatus 100 may enable the light fixture 50 to provide light and enable the various functionality of the security camera 104. The AC power provided by the power adapter 102 may enable the light fixture 50 to operate as if installed without the apparatus 100 to enable an existing (e.g., previously installed) light fixture to operate with the apparatus 100, without having to replace the light fixture 50 (e.g., any style/design of light fixture may be used, instead of using a specific design of light fixture for the apparatus 100). The AC power signal AC_IN may be controlled by the apparatus 100 to enable the various functionality of the security camera 104 to control the light fixture 50 (e.g., turn on/off a light bulb).

The security camera 104 may be configured to communicate a signal (e.g., COM). The signal COM may be communicated as an input to the security camera 104 and/or as an output generated by the security camera 104. In an example, the signal COM may be sent/received by a wireless communications module implemented by the security camera 104.

A network 40 is shown. The network 40 may be the internet. In some embodiments, the network 40 may be a local area network. The signal COM may be implemented to communicate to the network 40. Communicating with the network 40 may enable the security camera 104 to communicate with external devices and/or receive remote input (e.g., user input). The signal COM may comprise data for communicating according to a particular standard (e.g., Wi-Fi, Bluetooth, etc.). The signal COM may comprise video data captured by the security camera 104. The signal COM may comprise results of video analysis performed by a scalable computing network (e.g., cloud computing). The type of information communicated between the network 40 and the security camera 104 using the signal COM may be varied according to the design criteria of a particular implementation.

A device 42 is shown connected to the network 40. In the example shown, the device 42 may comprise a smartphone. While one device 42 is shown, the security camera 104 and/or the network 40 may communicate with more than one device 42. In some embodiments, the device 42 may be a desktop computer, a laptop computer, a smartwatch, a tablet computing device, a handheld device dedicated to the security camera 104, etc. The number and/or implementation of the device 42 may be varied according to the design criteria of a particular implementation.

A dotted box 106 is shown. The dotted box 106 may represent a companion app. The companion app 106 may comprise computer readable instructions that may be executed by the device 42. The companion app 106 may be configured to connect and/or operate with the security camera 104. The companion app 106 may comprise an application programming interface (API) to enable the device 42 to send data to and/or receive data from the security camera 104. In one example, a user (e.g., a homeowner) may provide instructions to the security camera 104. In another example, the security camera 104 may generate notifications to be displayed by the companion app 106. In yet another example, the security camera 104 may be configured to stream live and/or buffered video to the companion app 106. The companion app 106 may receive input from the user (e.g., to turn on a light of the light fixture 50), the companion app 106 may communicate with the network 40 and the network 40 may provide the instructions from the companion app 106 to the security camera 104 using the signal COM. The security camera 104 may read the signal COM determine that the user has provided an instruction to turn on the light bulb of the light fixture 50. The security camera 104 may generate the signal CTRL for the power supply 102 in response to the signal COM.

Figure 2:
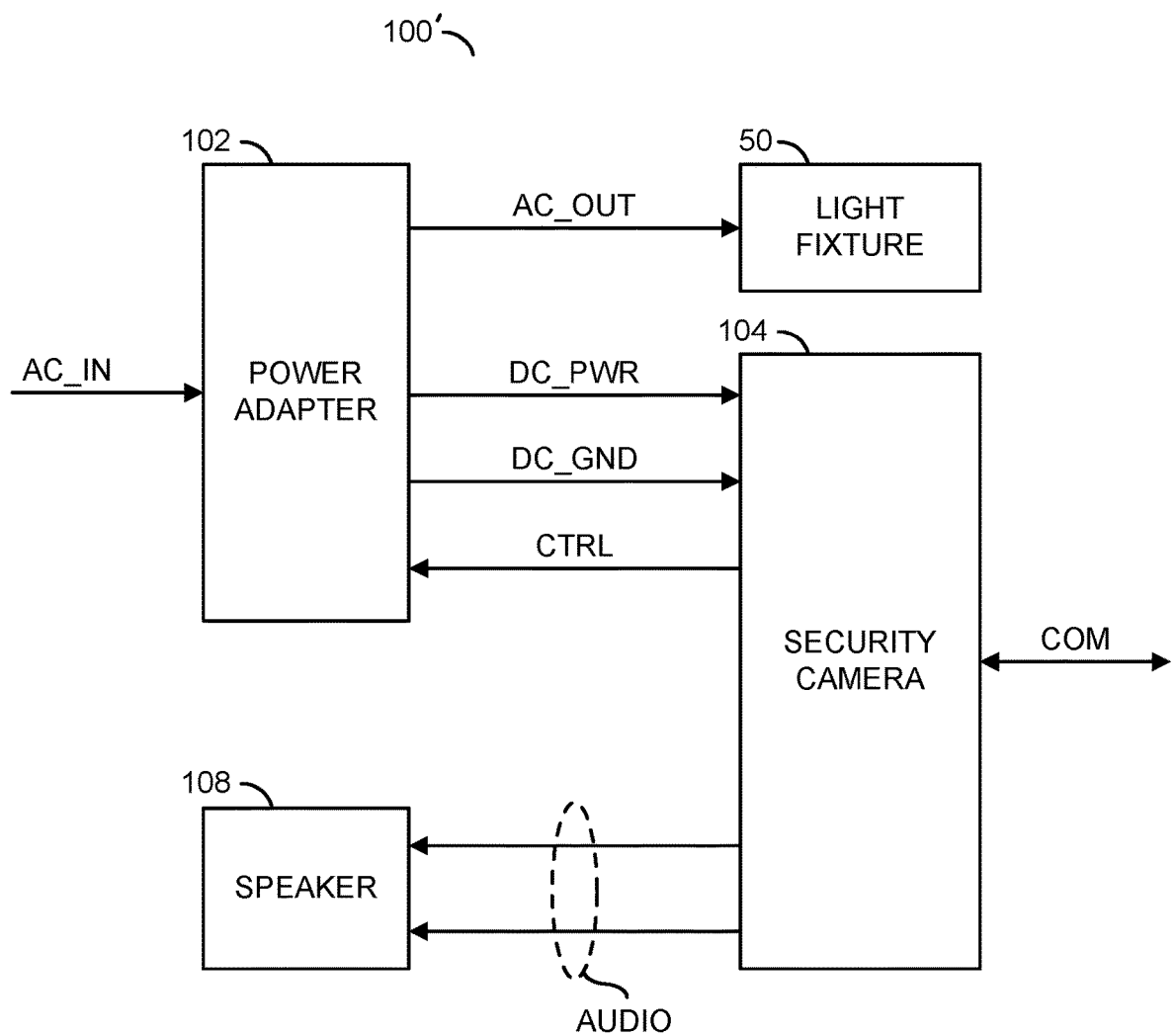
FIG. 2 is a diagram illustrating a block diagram of an alternate example embodiment of the present invention.

Referring to FIG. 2, a diagram illustrating a block diagram of an alternate example embodiment of the present invention is shown. The apparatus 100' is shown comprising, the light fixture 50, the power adapter 102, the security camera 104 and/or a block (or circuit) 108. The circuit 108 may implement a speaker. In some embodiments, the speaker 108 may be implemented as part of the security camera 104 (e.g., an integrated component). In some embodiments, the speaker 108 may be implemented separately from the security camera 104 (e.g., an after-market component and/or an add-on component). The implementation of the speaker 108 may be varied according to the design criteria of a particular implementation.

The power adapter 102 may be configured to receive the AC input AC_IN from the power supply of the premises. The power adapter 102 may be configured to receive the control signal CTRL from the security camera 104. The power adapter 102 may present the AC power supply signal AC_OUT to the light fixture 50 (e.g., to provide power for the light bulb). The power adapter 102 may convert the AC input to provide a DC power supply to the security camera 104. The connection between the power adapter 102 and the security camera 104 may generally comprise the power signal DC_PWR and the ground signal DC_GND.

The security camera 104 may implement a connection to the speaker 108. In some embodiments, where the speaker 108 is an integrated component, the circuit board of the security camera 104 may comprise connections to the speaker 108. In some embodiments, where the speaker 108 is an external component, the security camera 104 may further comprise two more speaker wires. In an example, the speaker wires may enable low frequency communication to provide audio output to the speaker 108.

The security camera 104 may receive the signal DC_PWR and the signal DC_GND. The security camera 104 may present the signal CTRL. The security camera 104 may send/receive the signal COM. The security camera 104 may present a signal (e.g., AUDIO). The signal AUDIO may be an audio output signal. In an example, the signal AUDIO may be an analog output signal generated by a digital-to-audio converter component implemented by the security camera 104. The speaker 108 may be configured to generate audio output in response the signal AUDIO. In some embodiments, the speaker 108 may receive power from the power adapter 102 (e.g., a powered speaker implementation). In the example shown, the speaker 108 may not be a powered speaker. In an example, the security camera 104 may be configured to determine whether to activate/deactivate the light bulb in the light fixture 50 by generating the control signal CTRL and/or determine whether to playback audio using the speaker 108 by generating the signal AUDIO.

Figure 3:
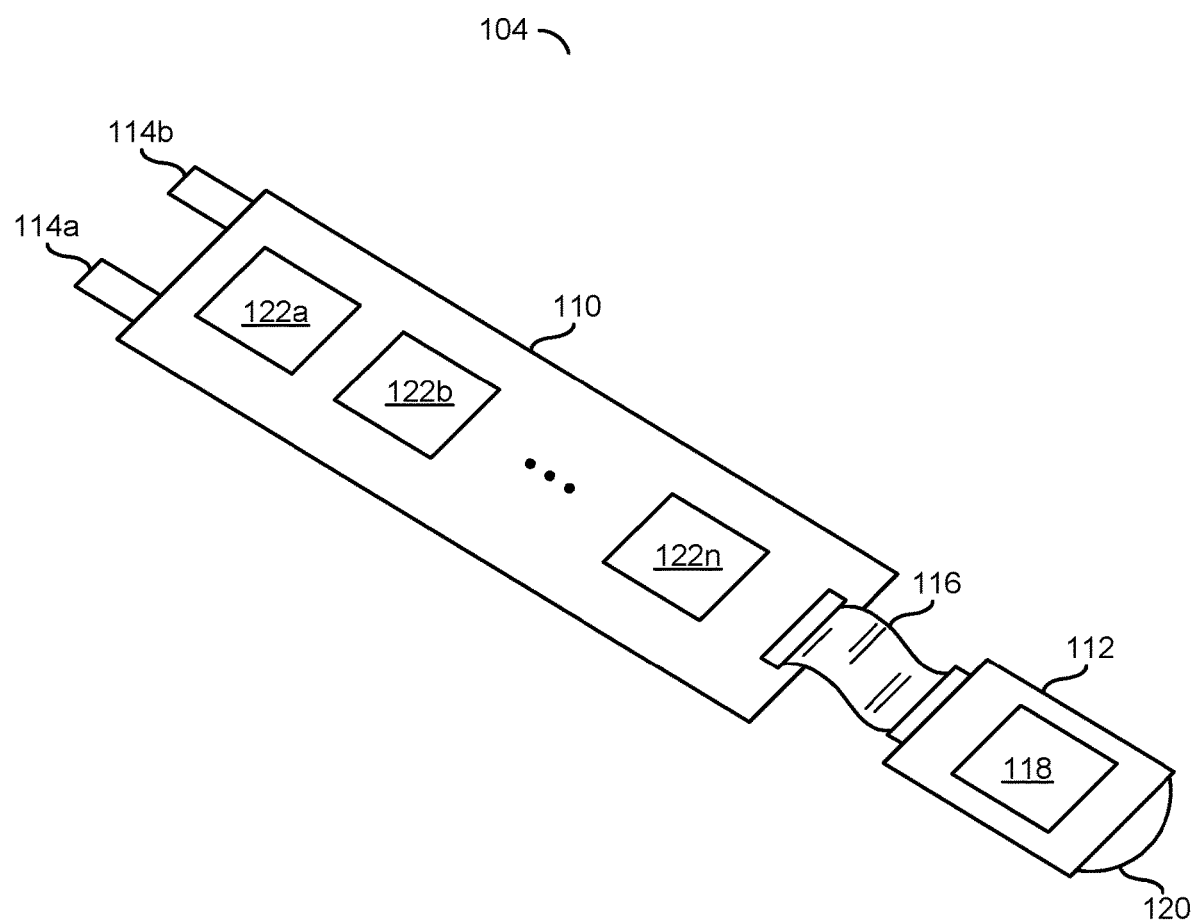
FIG. 3 is a diagram illustrating a circuit implemented by the security camera.

Referring to FIG. 3, a diagram illustrating a circuit implemented by the security camera 104 is shown. The security camera 104 may comprise a block (or circuit) 110, a block (or circuit) 112 and/or blocks (or circuits) 114a-114b. The block 110 may implement a circuit board. The block 112 may implement a camera module. The blocks 114a-114b may implement connectors. The security camera 104 may comprise other components (not shown). The number, type and/or arrangement of the components of the security camera 104 may be varied according to the design criteria of a particular implementation. In an example, the circuit board 110 and/or the camera module 112 may be implemented using approximately 6 square inches of circuit board.

The connectors 114a-114b are shown attached to the circuit board 110. The connectors 114a-114b may implement an electrical connection between the power adapter 102 and the security camera 104. In an example, the connectors 114a-114b may be implemented as a pair of conductive prongs. In some embodiments, the connectors 114a-114b may further provide a mechanical connection. For example, the connectors 114a-114b may implement a locking mechanism to secure the security camera 104 to a mounting point in addition to the electrical connection. The connectors 114a-114b may be configured to receive power and/or communicate other signals. In an example, the connectors 114a-114b and/or another connector may receive the signal DC_PWR from the power adapter 102. In another example, the connectors 114a-114b and/or another connector may receive the signal DC_GND from the power adapter 102. In yet another example, the connectors 114a-114b and/or another connector may receive the signal CTRL from the circuit board 110.

A cable 116 is shown connecting the circuit board 110 and the camera module 112. In one example, the cable 116 may be implemented as a flexible ribbon cable. The flexible ribbon cable 116 may enable a high-speed data transfer. For example, the ribbon cable 116 may be sufficient to communicate high resolution video data (e.g., 720P, 1080P, 4K, etc.). The flexible ribbon cable 116 may be rigid enough to support the camera module 112 (e.g., maintain a position after being flexed) and/or enable the camera module 112 to pivot (e.g., be directed) at an angle with respect to the circuit board 110. For example, the flexible ribbon cable 116 may be flexed to direct the camera module 110 in any direction (e.g., up, down, left, right) and rigid enough to remain in the flexed position after being set by a user.

The camera module 112 may be implemented as a circuit board comprising a block (or circuit) 118 and/or a lens 120. The circuit 118 may implement an image sensor. The camera module 112 may comprise other components (e.g., a video data buffer, sensor logic, a microphone, etc.). The number, type and/or arrangement of the components of the camera module 112 may be varied according to the design criteria of a particular implementation.

The image sensor 118 may be configured to convert incoming light into images and/or video data. The lens 120 may be configured to focus incoming light onto the image sensor 118. In an example, the lens 120 may be a wide angle lens. The lens 120 and the image sensor 118 may be configured to capture images (e.g., raw video frames) of the environment near the security camera 104. In one example, the camera module 112 may further comprise night vision functionality. In yet another example, the camera module 112 may implement at least one of PIR or IR LED that may be placed at the lens/sensor module 112. The image sensor 118 may capture the video data and then transmit the video data to the circuit board 110 via the flexible ribbon cable 116.

The circuit board 110 may comprise a number of blocks (or circuits) 122a-122n. Each of the circuits 122a-122n may implement a component. The components 122a-122n may be configured to implement the features and/or functionality of the security camera 104. In an example, the components 112a-112n may comprise a video processor, an audio processor, microphone, a wireless communication module (e.g., Wi-Fi and/or Bluetooth), etc. One of the components 122a-122n may implement the speaker 108. In some embodiments, one or more of the components 122a-122n may be configured to implement similar functionality as another one of the components 122a-122n. In some embodiments, each of the components 122a-122n may be configured to implement different functionality. The number of components 122a-122n implemented and/or the type(s) of functionality implemented by each of the components 122a-122n may be varied according to the design criteria of a particular implementation.

In an example, the component 122a may implement a video processor. The video processor 122a may control the various functionality of the security camera 104. The video processor 122a may be configured to generate video data (e.g., provide a video stream to a mobile device). The video processor 122a may be configured to analyze the video data and make decisions (e.g., provide notifications when a visitor is detected and/or a package is delivered). In an example, the component 122b may implement a wireless communication module. The wireless communication module 122b may be configured to enable a wireless connection to the internet and/or a local network 40. The wireless communication module 122b may be configured to send/receive the signal COM. The internet connection may enable the video processor 122a to send notifications to the mobile device 42 that may operate the companion application 106 for the security camera 104. One or more of the processor 122a, the wireless communication module 122b and/or another of the components 122a-122n may be configured to generate the control signal CTRL.

Figure 4:
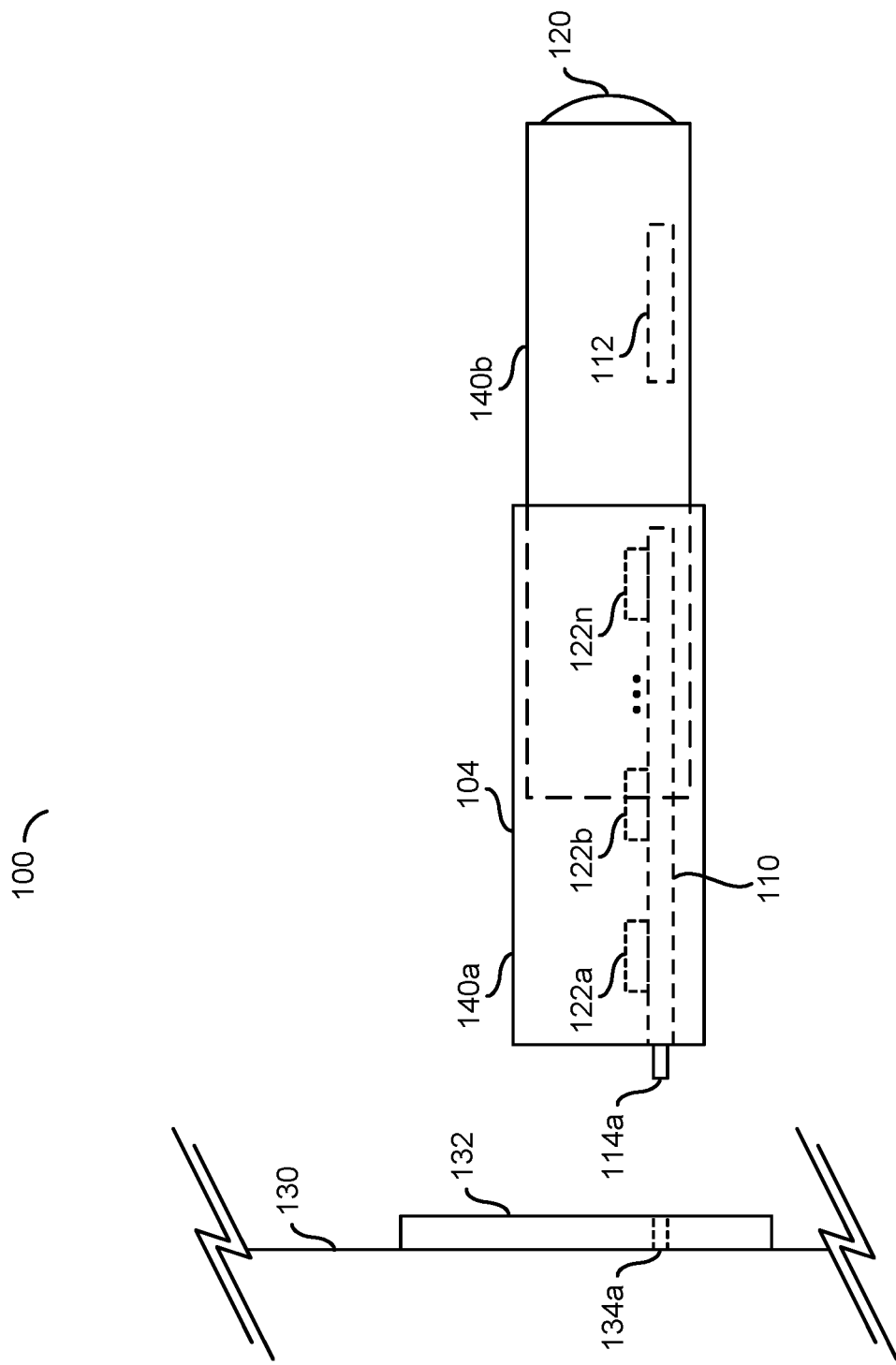
FIG. 4 is a diagram illustrating an example implementation of an apparatus.

Referring to FIG. 4, a diagram illustrating an example implementation of the apparatus 100 is shown. The apparatus 100 may comprise the security camera 104 and a base 130. A portion of the base 130 is shown. The base 130 may be a universal base plate (e.g., a wall adapter). The security camera 104 may be configured to connect to the universal base plate 130.

The universal base plate 130 may be configured to attach to a wall. The universal base plate 130 may be configured to attach to the light fixture 50. The universal base plate 130 may implement a mechanical connection to the wall (e.g., a mounting location on a premises) and the light fixture 50. In an example, the universal plate 130 may be configured to be clamped in between the light fixture 50 and the wall. For example, the force of securing the light fixture 50 to the wall (e.g., connecting to a mounting point in a junction box located in the wall), may secure the base plate 130.

The base plate 130 may comprise an attachment location 132. The attachment location 132 may comprise the connector socket 134a. From the perspective shown in association with FIG. 4, one connector socket 134a is shown. However, a number of connector sockets (e.g., 134a-134n) may be implemented by the attachment location 132. The connector sockets 134a-134b may electrically connect to the power adapter 102. The connector sockets 134a-134n may be configured to electrically connect to the security camera 104. In an example, the connector sockets 134a-134b may electrically connect to the connectors 114a-114b. By implementing the connectors 114a-114b, the security camera 104 may be attached to the attachment location 132 without an exposed wire (e.g., the connectors 114a-114b may directly plug into the connector sockets 134a-134b).

The attachment location 132 may be configured to provide a mechanical connection between the base plate 130 and the security camera 104. The attachment location 132 and/or the connector sockets 134a-134n may be configured to accept and secure a connection to the security camera 104. The security camera 104 may be removably attached to the attachment location 132. Removably attaching the security camera 104 to the attachment location may enable the security camera 104 to be portable (e.g., removed and attached to many different base plates 130). In an example, the connector sockets 134a-134b may accept the connectors 114a-114b and the attachment location 132 may lock the connectors 114a-114b into the connector sockets 134a-134b (e.g., a latch or clips may be provided to provide a lock, the connectors 114a-114b may twist-lock into the attachment location 132, etc.). The method of securing the security camera 104 to the base 130 may be varied according to the design criteria of a particular implementation.

The attachment location 132 may comprise the connector sockets 134a-134n that may accept the connectors 114a-114n of the security camera 104. The connector sockets 134a-134b may be configured to implement at least a power connection and a ground connection for the security camera 104. In an example, the connector socket 134a may provide the DC power signal DC_PWR to the connector 114a. In another example, the connector socket 134b may provide the DC ground signal DC_PWR to the connector 114b. Additional connectors may be implemented. In an example, the connector socket 134c may receive the control signal CTRL generated by the processor 122a from the connector 114c. The number of connectors and/or types of signals communicated between the security camera 104 and the attachment location 132 may be varied according to the design criteria of a particular implementation.

The security camera 104 is shown implemented as a cylindrical enclosure. The cylindrical enclosure may comprise portions 140a-140b. The portions 140a-140b may be retractable (e.g., part of the portion 140b is shown within the portion 140a and may be partially pulled from the portion 140a). For example, the cylindrical enclosure 140a-140b may be an extendable arm (from a length of approximately 6 inches to 9 inches). In an example, the cylindrical enclosure may have a diameter of 1 inch. In the example shown in association with FIG. 4, the security camera 104 may comprise the two portions 140a-140b. However, any number of portions may be implemented. The size, shape and/or amount of retraction of the portions of the security camera 104 may be varied according to the design criteria of a particular implementation. In the example shown, the security camera 104 may be implemented as an extendable arm. The extendable arm may be implemented by the portions 140a-140b. The security camera 104 may comprise the camera module 112 at one end (e.g., the end with the portion 140b). The security camera 104 may comprise a connector base (e.g., the connectors 114a-114b) at another end (e.g., the end with the portion 140a). The security camera 104 may comprise a retractable enclosure. For example, the security camera 104 may retract to a shorter length when the portion 140b retracts into the portion 140a. In another example, the security camera 104 may extend to a longer length when the portion 140b extends from the portion 140b. The security camera 104 may enclose the circuit board 110 (e.g., with the components 122a-122n) and/or the camera module 112 (e.g., with the image sensor 118).

The circuit board 110 and the camera module 112 (e.g., components that provide the electronic functionality of the security camera 104) may be implemented within the enclosure/housing of the security camera 104 (e.g., the portions 140a-140b). In the example shown, the portions 140a-140b may be a cylindrical shape. In another example, the enclosure 140a-140b may be an oblong shape. In yet another example, the enclosure 140a-140b may be a rectangular shape. While a cylindrical shaped enclosure is shown, the shape of the security camera 104 may be varied according to the design criteria of a particular implementation. Generally the enclosure 140a-140b may be implemented as any shape that may fit the circuit board 110 and/or the processor module 122a (e.g., approximately 1 inch width and 6 inches long).

The base 130 may be configured to provide a retrofit for the light fixture 50. The base 130 may enable the light fixture 50 to be attached to the wall, while providing a mounting location for the security camera 104. By providing a mounting location for the security camera 104, the functionality of the security camera 104 may be added to any type of light fixture. For example, a homeowner may already own a light fixture and may not want to change the previously owned light fixture in order to add the functionality of the security camera 104. The base plate 130 may enable the security camera 104 to be used with the previously owned light fixture 50.

The security camera 104 may connect to the base 130 at the attachment location 132. The attachment location 132 may enable the security camera 104 to be placed anywhere around the light sconce of the light fixture 50 (e.g., left or right or top, in a more discreet manner). By enabling a variety of installation locations for the security camera 104, the base 130 and the security camera 104 may be configured to accommodate many different design/styles of the light fixture 50 (e.g., capture video data without being obstructed by the light sconce and/or limiting the amount of glared captured).

The security camera 104 may be a self-contained device. The security camera 104 may comprise the circuit board 110 comprising at least the video processor 122a, the image sensor 118 and the lens 120. The self-contained security camera 104 may be configured to perform calculations and/or decisions for various security functionality (e.g., generate video data, communicate wirelessly with a mobile device, perform object detection, generate notifications, perform facial recognition, etc.). In some embodiments, the security camera 104 may communicate wirelessly to a scalable computing service (e.g., cloud processing) to receive results for computationally intensive operations (e.g., object detection, facial recognition, etc.) performed by the scalable computing service. The security camera 104 may receive power by attaching to the attachment location 132 to connect to the power adapter 102. The security camera 104 may be portable (e.g., moved to any implementation of the apparatus 100). For example, the security camera 104 may be attached to a different base plate 130 for a different light fixture 50 at another entrance to a premises. In another example, the security camera 104 may be attached to a different base plate 130 for a different light fixture 50 at a different premises.

Figure 5:
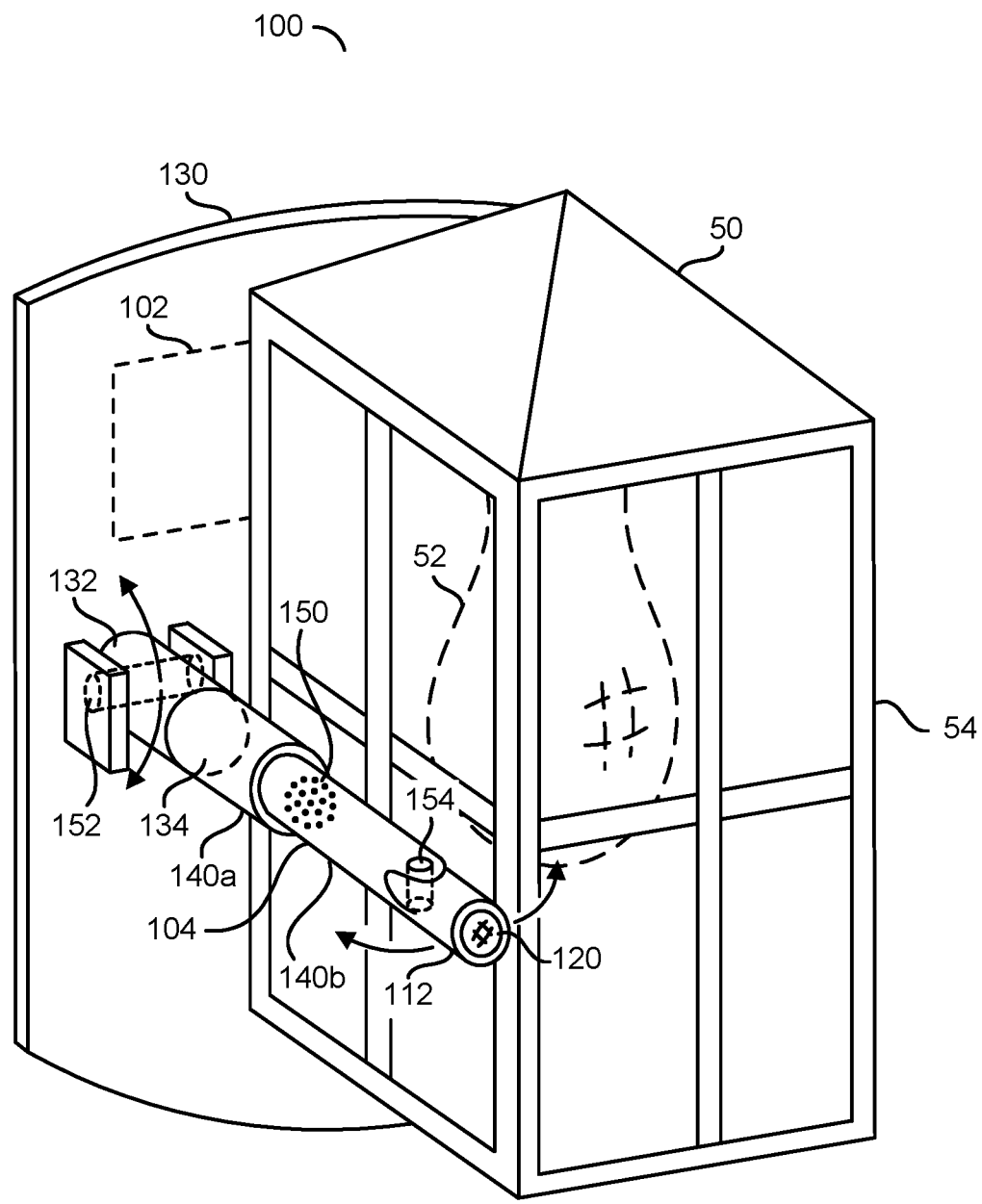
FIG. 5 is a diagram illustrating an example security camera attached to a light fixture.

Referring to FIG. 5, a diagram illustrating an example security camera attached to a light fixture is shown. The power adapter 102 is shown within the base 130. The light fixture 50 is shown attached (e.g., mounted) to the base 130. A light bulb 52 is shown connected to the light fixture 50. In an example, the light bulb 52 may be powered by the signal AC_OUT generated by the power adapter 102. A light sconce 54 (e.g., lamp shade) is shown as part of the light fixture 50. The light bulb 52 may be installed within the light sconce 54.

In the example shown, the light sconce 54 may be a lamp shade that hangs down. If a security camera were integrated into the base plate above the light sconce 54, the light sconce 54 may block the field of view of the most likely area of interest (e.g., a field of view directed towards the ground in the area below the light fixture 50, such as a front doorway). If a security camera were integrated into the base plate below the light sconce 54, glare from the light bulb 52 may result in a 'washed out' look of the output video data. The shape and/or design of the light fixture 50 may cause difficulties in capturing video data. However, the homeowner may not want to change the light fixture 50.

The security camera 104 is shown attached to the base plate 130. The security camera 104 is shown located on a right side of the light sconce 54 of the light fixture 50 (e.g., capturing a field of view as if a person standing on a right side of the light fixture 50 was looking out). The portions 140a-140b of the security camera 104 are shown attached to the attachment location 132. The portions 140a-140b may extend the security camera 104 slightly beyond a front face of the light fixture 50.

The light bulb 52 may generate light that may cause glare in video captured by the security camera 104. The apparatus 100 may be configured to block glare from the light bulb 52. The apparatus 100 may be configured to prevent the field of view of the lens 120 from being blocked by the light sconce 54. The lens 120 may be located beyond (e.g., in front of) a front face of the light sconce 54 to have a FOV from the light fixture 50 outward, and avoid glare from the light bulb 52. The security camera 104 may be discreet and elegant.

The connector 134 may enable the security camera 104 to be easily mounted to the base plate 130 with no wires exposed. In the example shown, the security camera 104 is on the right side of the light sconce 54 and the power adapter 102 may be built into the base plate 130 at the top of the wall plate adapter base 130. The attachment location 132 may be on the left or right side of the light sconce 54 to enable the camera 104 to be securely mounted on either side of the light sconce 54 with power/ground connections and rotational freedom. The position of the attachment location 132 on the base plate 130 and/or the power adapter 102 in the base plate 130 may be varied according to the design criteria of a particular implementation.

A speaker grille 150 is shown on the security camera 104. The speaker grille 150 may be configured to enable audio to be emitted from a component within the portions 140a-140b. In an example, the speaker grille 150 may enable audio generated by the speaker 108 implemented within the housing 140a-140b to be emitted clearly. In another example, one of the components 122a-122n within the housing 140a-140b may implement a microphone and the speaker grille 150 may enable incoming audio to be captured by the microphone.

A hinge 152 is shown as part of the attachment location 132. The hinge 152 may be a vertical rotation hinge. The hinge 152 may be configured to pivot along the vertical axis. In an example, the connector base (e.g., the connectors 114a-114b) may pivot vertically. The vertical hinge 152 may enable 180 degree up and down rotation of the security camera 104. In an example, the security camera 104 may be rotated up (e.g., stowed in a position parallel to the base 130 in a full upright position) to hide the security camera 104 (e.g., when not in use). In another example, the security camera 104 may be rotated down (e.g., in a position parallel to the base 130 in directed downwards) to capture a view of the ground directly underneath the light fixture 50.

A hinge 154 is shown near the lens 120. The hinge 154 may be a component of the security camera 104. The hinge 152 may enable the lens 120 to rotate horizontally and/or vertically with respect to the portion 140b. The hinge 154 may be configured to pivot along the horizontal axis. In the example shown, the hinge 154 may enable the camera module 112 to rotate 90 degrees to the right and 90 degrees to the left. Rotating the camera module 150 to the left or might may provide the lens 120 an alternate field of view to capture.

The camera/lens module 112 may pivot from 0 to 90 degrees. In the example shown, the hinge 154 may enable the camera module 112 to pivot horizontally. In some embodiments, the ribbon cable 116 may be flexible to enable the camera module 112 to pivot in all directions. Pivoting the camera module 112 in one direction at the end of the cylindrical portions 140a-140n may direct the lens 120. Since the portions 140a-140b may be extended so that the lens 120 is beyond the lamp shade 54, the camera module 112 may be pivoted without the field of view of the lens 120 being obstructed by the lamp shade 54.

The base plate 130 may implement an adapter wall plate. The adapter wall plate 130 may be configured to enable old and new light fixtures (e.g., light sconce and mounting hardware) to be connected without any modification of the light fixture 50. For example, the wall plate adapter 130 may provide a retrofit to enable the functionality of the security camera 104 for light fixtures that do not have security camera functionality integrated and/or do not have mounting locations for security cameras.

Figure 6:
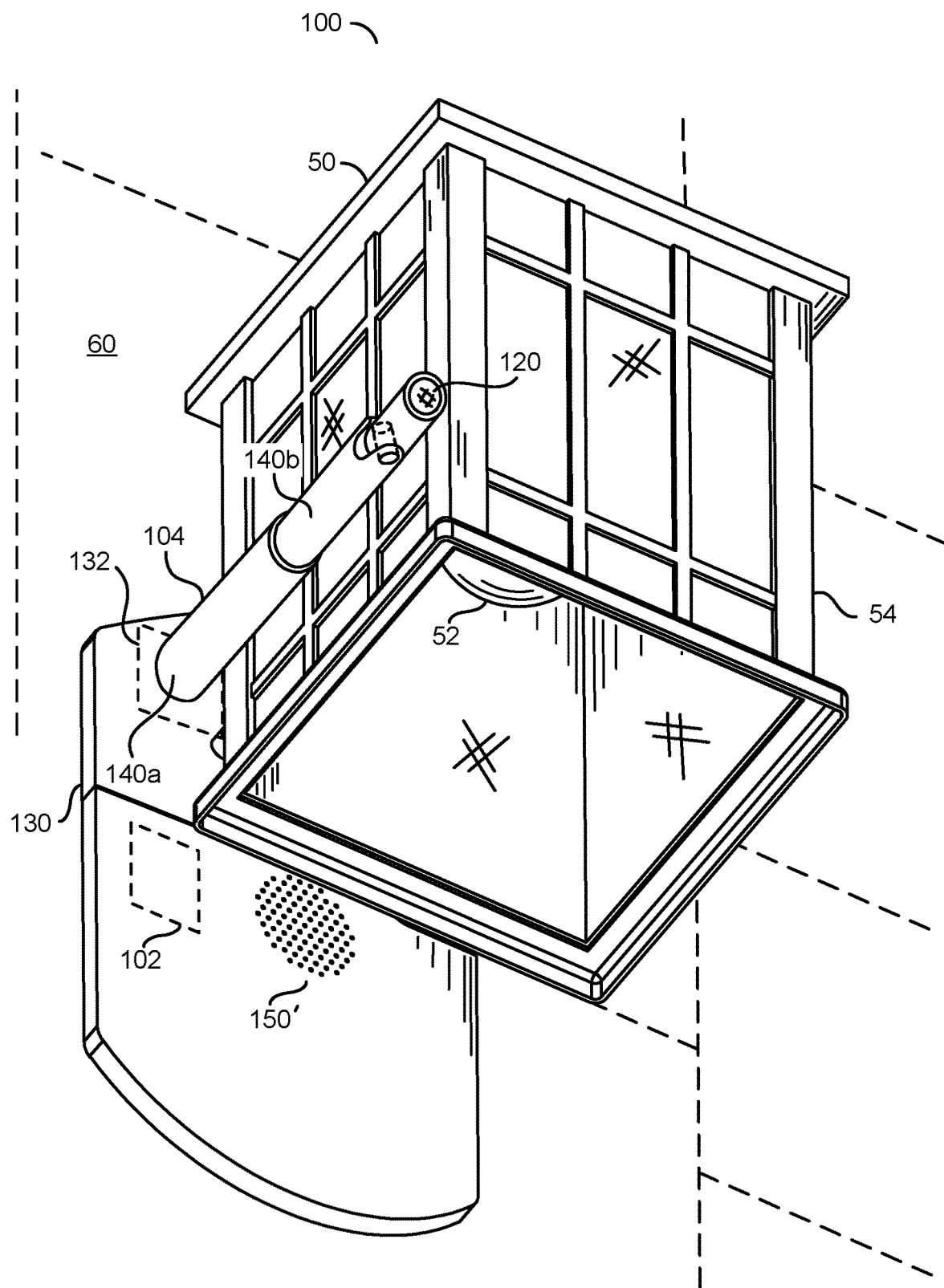
FIG. 6 is a diagram illustrating an example security camera attached to a light fixture with a separate speaker.

Referring to FIG. 6, a diagram illustrating an example security camera attached to a light fixture with a separate speaker is shown. The apparatus 100 is shown comprising the security camera 104 and the base plate 130. The light fixture 50 is shown attached to the base plate 130. The light fixture 50 may comprise the light bulb 52 and the lamp shade 54.

The security camera 104 is shown located beside the lamp shade 54. The security camera 104 is shown connected to the attachment location 132. The portions 140a-140b may be extended to enable the lens 120 to be located beyond the front face of the lamp shade 54. Locating the lens 120 beyond the front face of the lamp shade 54 may prevent capturing glare from the light bulb 52 in the captured video frames.

The base 130 is shown implementing the speaker grille 150'. In some embodiments, the speaker functionality may not be implemented by the security camera 104 (e.g., not within the portions 140a-140b). The speaker 108 may be implemented within the base 130. The sound generated by the speaker 108 may be emitted through the speaker grille 150'. For example, when the speaker 108 is implemented within the base plate 130, the security camera 104 may implement one of the connectors 114a-114n to provide the signal AUDIO to one of the connector sockets 134a-134n to communicate audio signals. For example, one or more of the connector sockets 134a-134n of the attachment location 132 may implement connections for the speaker 108.

In some embodiments, the cylindrical portions 140a-140b may be flexible to enable the shape and/or direction of the lens 120 to be adjusted. For example, the flexible portions 140a-140b may enable the security camera 104 to be moved up/down and left/right without implementing the hinges 152-154. Implementing the security camera 104 with the flexible portions 140a-140b may enable the field of view of the lens 120 to be adjusted with more degrees of freedom than using the retractable portions 140a-140b.

The base plate 130 is shown mounted to a wall 60. The base plate 130 may be secured between the wall 60 and the light fixture 50. The base plate 130 may be secured to the wall 60. The light fixture 50 may be secured to the base plate 130. The wall 60 may provide the physical support for the base plate 130 and the light fixture 50. The base plate 130 may be clamped between the light fixture 50 and the wall 60.

Figure 7:
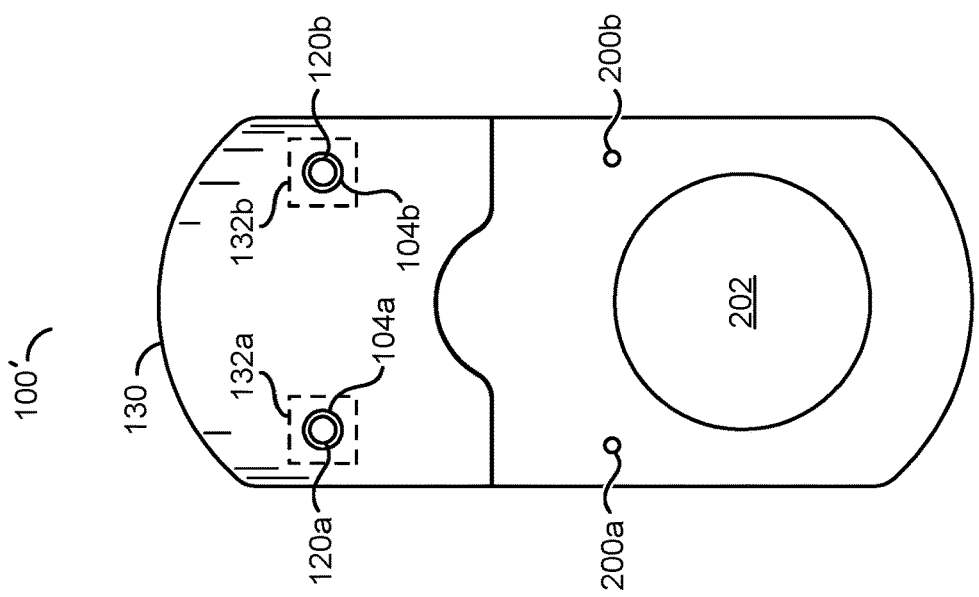
FIG. 7 is a diagram illustrating an example embodiment of a wall plate adapter.

Referring to FIG. 7, a diagram illustrating an example embodiment of a base of a wall plate adapter is shown. A front view of the apparatus 100' is shown. The base 130 is shown without the light fixture 50 attached. In an example, the base plate 130 may be provided without the light fixture 50. The homeowner may attach any type of the light fixture 50 to the base plate 130. In an example, the base plate 130 may be secured to the wall 60. Then the light fixture 50 may be attached to the base plate 130. In the example shown in association with FIG. 7, the apparatus 100' is shown before the light fixture 50 is attached.

The base 130 is shown implementing multiple attachment locations 132a-132b. The attachment locations 132a-132b may be implemented on the base plate 130 to be located on either side of the light fixture 50. In the example shown, when the light fixture 50 is attached to the base plate 130, the attachment locations 132a-132b may be visible (e.g., not covered by lamp shade 54).

The security camera 104 may be mounted on the left or right side of the light sconce 54. In an example, the security camera 104 may be attached to the attachment location 132a (e.g., to the right of the light fixture 50). In another example, the security camera 104 may be attached to the attachment location 132b (e.g., to the left of the light fixture 50). In some embodiments, multiple security cameras 104a-104b may be attached. In the example shown, the security camera 104a is shown attached to the attachment location 132a and the security camera 104b is shown attached to the attachment location 132b. Connecting the security cameras 104a-104b to the attachment locations 132a-132b may enable each of the camera lenses 120a-120b to capture a different field of view (e.g., the lens 120a may capture a field of view to the right side of the lamp shade 54 and the lens 120b may capture a field of view to the left side of the lamp shade 54). In an example, either of the security cameras 104a-104b may be configured to generate the signal CTRL to control the light bulb 52.

Mounting screws 200a-200b are shown. In some embodiments, the mounting screws 200a-200b may enable the base plate 130 to be mounted to the wall 60. In some embodiments, the mounting screws 200a-200b may enable the light fixture 50 to connect to the base plate 130.

An opening (e.g., a mounting hole) 202 is shown. The wall plate adapter base 130 may comprise the opening 202. The opening 202 may pass through the entire depth of the base plate 130. The opening 202 may be configured to enable mounting hardware and/or electrical cables the light fixture 50 to feed through the wall plate adapter 130 and attach to a mounting location (e.g., a junction box on the wall 60) on the premises. For example, conventional mounting hardware may be implemented by the light fixture 50 (e.g., to attach to a junction box for a conventional installation). The mounting hardware of the light fixture 50 may pass through the opening 202 to enable the light fixture 50 to be secured to the premises.

The mounting hole 202 may be larger than the mounting hardware implemented by the light fixture 50. In some embodiments, the wall plate adapter 130 may be secured to the wall 60 by the pressure applied by attaching the light fixture 50 to the wall 60 (e.g., the plate adapter 130 may be squeezed between the wall 60 and the mounting hardware of the light fixture 50).

The adapter wall plate 130 may implement the mounting hole 202 having a size that is bigger than most wall junction boxes and smaller than the existing wall plate (e.g., mounting hardware) of old and new light fixtures. The mounting hole 202 may enable the adapter wall plate 130 to accept the existing wall plate (e.g., the mounting hardware) of existing light fixtures. The universal wall plate 130 may be configured as an adapter plate to accept a complete light fixture (the light sconce 54 and the mounting hardware).

In some embodiments, the light fixture 50 may be secured to the base plate 130 using the mounting screws 200a-200b. For example, the mounting hardware of the light fixture 50 may be secured to the base plate 130 using the mounting screws 200a-200b. Wiring from the light fixture 50 may pass through the opening 202 to connect to the power adapter 102. The power adapter 102 may also be connected to the wiring of the premises. Passing the wiring from the light fixture 50 through the opening 202 may enable the power adapter 102 to transmit the signal AC_OUT to power the light bulb 52. Passing the wiring from the light fixture 50 may hide the wiring when the light fixture 50 is secured in front of (e.g., over top) the opening 202.

In some embodiments, the mounting screws 200a-200b may be implemented within the mounting hole 202. For example, the base plate 130 may be pressed against the wall 60 with the opening 202 over top of the mounting hardware on the wall 60 (e.g., over the junction box). The mounting screws 200a-200b may be configured to secure the wall plate 130 to the wall 60. The wiring from the light fixture 50 may pass through the opening 202 to connect to the power adapter 102 and/or the wiring of the premises. In an example, the mounting screws 200a-200b may be implemented with a threaded male end on one side to securely connect the base plate 130 to the wall 60, and a female threaded end on another end to accept screws for the mounting hardware of the light fixture 50. For example, the mounting screws 200a-200b may be configured to both secure the base plate 130 to the wall 60 and secure the light fixture 50 to the base plate 130.

Figure 8:
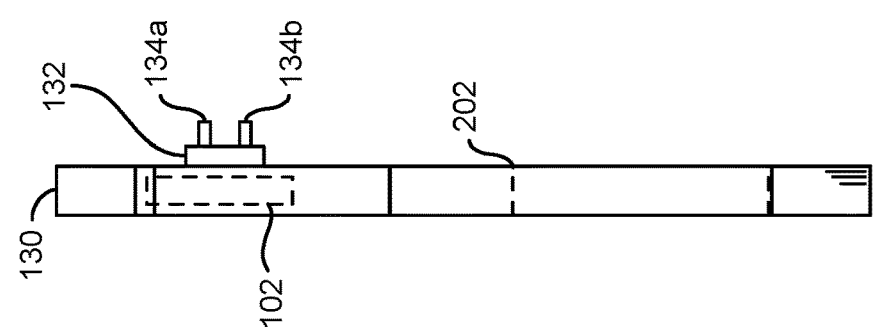
FIG. 8 is a diagram illustrating a side view of a base of a wall plate adapter.

Referring to FIG. 8, a diagram illustrating a side view of a base of a wall plate adapter is shown. A side view of the base plate 130 is shown without the security camera 104 connected and without the light fixture 50 attached. The attachment location 132 and the opening 202 are shown on the base plate 130. The base plate 130 may have a thin profile.

In the example shown, the power adapter 102 is within the wall plate adapter 130. In some embodiments, the power adapter 102 and/or the speaker 108 may be located at the top of the adapter wall plate 130. The attachment location 132 is shown having the connectors 134a-134b. The power adapter 102 may be located near the connectors 134a-134b to provide a connection to provide the signal DC_PWR and the signal DC_GND. In the example shown, the connector sockets 134a-134b may be implemented as male connectors and may attach to the connectors 114a-114b implemented as female connectors. In another example, the connector sockets may be implemented as female connectors and may attach to the connectors 113a-113b implemented as male connectors.

The mounting hole 202 is shown in the side view of the apparatus 100. The mounting hole 202 may extend through the entire depth of the base plate 130. In an example, the wiring from the light fixture 50 may be fed through the opening 202 to connect to the power adapter 102. The power adapter 102 may provide the signal AC_OUT to the light fixture 50.

Figure 9:
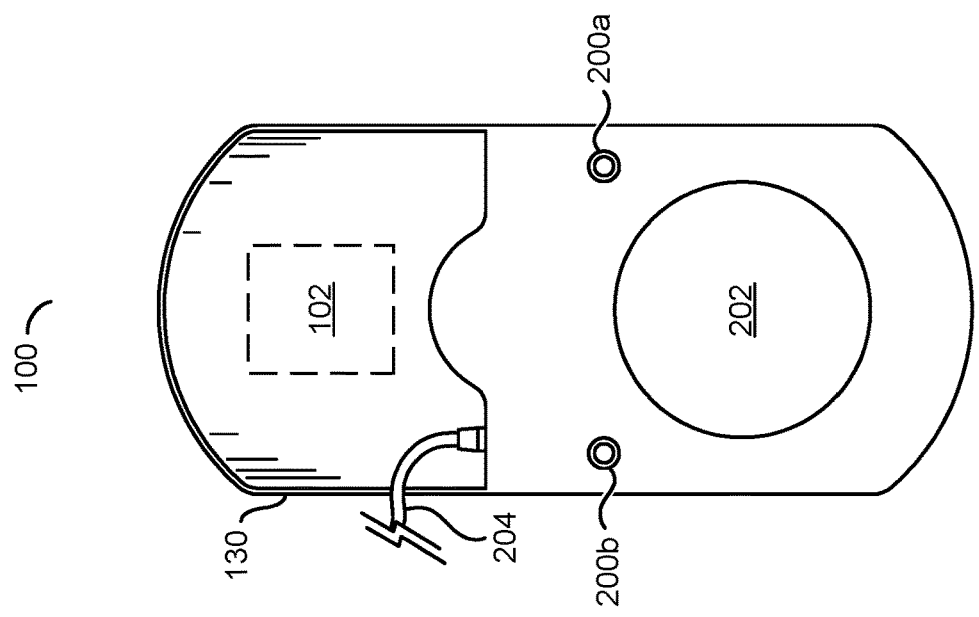
FIG. 9 is a diagram illustrating a back view of a base of a wall plate adapter.

Referring to FIG. 9, a diagram illustrating a back view of a base of a wall plate adapter is shown. In the back view, the security camera 104 may not be visible. In the back view shown, the light fixture 50 may not be attached. The power adapter 102 is shown. The mounting screws 200a-200b and the opening 202 are shown.

A cable 204 is shown. The cable 204 may extend from the rear of the base plate 130. In some embodiments, the cable 204 may implement other data/power cabling (e.g., a USB connection to connect to a computer, a laptop, a tablet computing device, a charging device, etc.). In some embodiments, the cable 204 may provide a connection to the power adapter 102.

In an example, the cable 204 may connect to wiring of the premises. For example, the rear of the base plate 130 may be placed over top of a junction box. The wiring from the junction box may be connected to the cable 204 and/or wiring of the light fixture 50. The cable 204 may enable the power adapter 102 to receive the signal AC_IN.

In some embodiments, the wiring from the light fixture 50 may be passed through the opening 202. The wiring from the light fixture 50 may be connected to the cable 204. The cable 204 may enable the power adapter 102 to provide the signal AC_OUT to the light fixture 50.

Figure 10:
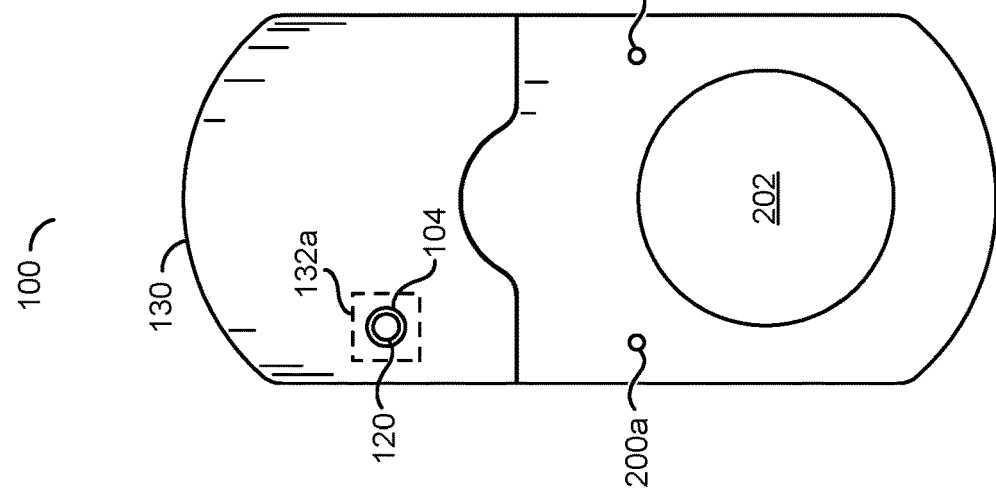
FIG. 10 is a diagram illustrating an example base implementing a right side attachment location.

Referring to FIG. 10, a diagram illustrating an example base implementing a right side attachment location is shown. A front view of the apparatus 100 is shown. The apparatus 100 is shown without the light fixture 50 attached. The apparatus 100 may comprise the base plate 130 with the security camera 104 attached.

The base plate 130 is shown comprising the attachment location 132a, the mounting screws 200a-200b and/or the mounting hole 202. In some embodiments, one attachment location 132a may be implemented. In the example shown, the attachment location 132a may be located on the right side of the light sconce 54. The security camera 104 may be attached to the attachment location 132a. For example, the lens 120 may capture a field of view from a perspective looking outwards from the apparatus 100 on a right side of the lamp shade 54.

In the example shown, only one attachment location 132a may be implemented. In some embodiments, the apparatus 100 may be provided with a single option for a location for attaching the security camera 104. In the example shown, the apparatus 100 may provide only a right side attachment option (e.g., no left side option).

Figure 11:
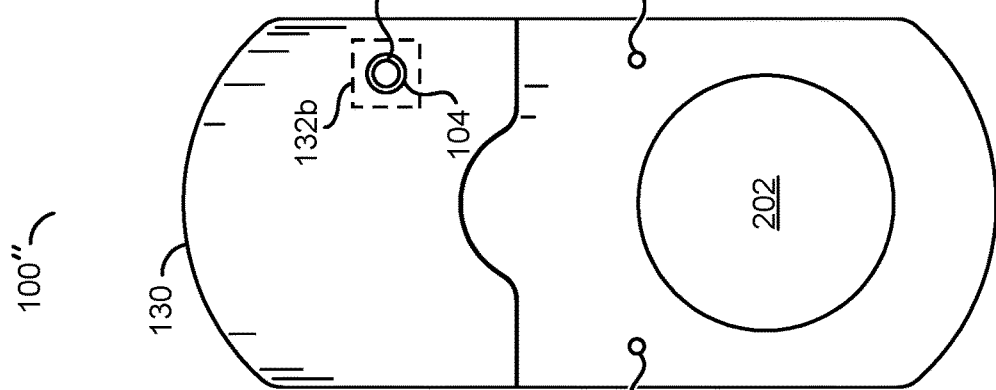
FIG. 11 is a diagram illustrating an example base implementing a left side attachment location.

Referring to FIG. 11, a diagram illustrating an example base implementing a left side attachment location is shown. A front view of the apparatus 100" is shown. The apparatus 100" is shown without the light fixture 50 attached. The apparatus 100" may comprise the base plate 130 with the security camera 104 attached.

The base plate 130 is shown comprising the attachment location 132b, the mounting screws 200a-200b and/or the mounting hole 202. In some embodiments, one attachment location 132b may be implemented. In the example shown, the attachment location 132b may be located on the left side of the light sconce 54. The security camera 104 may be attached to the attachment location 132b. For example, the lens 120 may capture a field of view from a perspective looking outwards from the apparatus 100" on a left side of the lamp shade 54.

In the example shown, only one attachment location 132b may be implemented. In some embodiments, the apparatus 100" may be provided with a single option for a location for attaching the security camera 104. In the example shown, the apparatus 100" may provide only a left side attachment option (e.g., no right side option).

Figure 12:
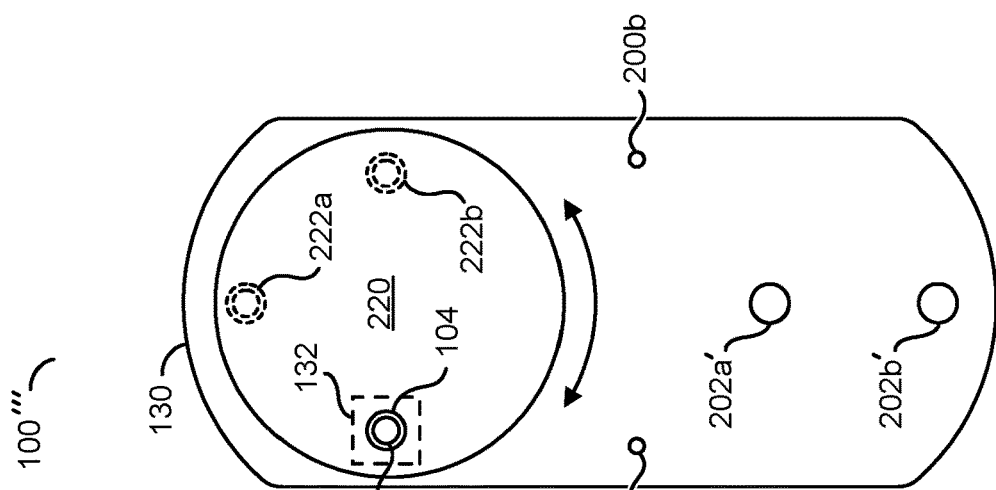
FIG. 12 is a diagram illustrating an example base implementing a rotatable portion.

Referring to FIG. 12, a diagram illustrating an example base implementing a rotatable portion is shown. A front view of the apparatus 100''' is shown. The apparatus 100''' is shown without the light fixture 50 attached. The apparatus 100''' may comprise the base plate 130 with the security camera 104 attached.

The base plate 130 is shown comprising the attachment location 132, the mounting screws 200a-200b and/or the mounting holes 202a'-202b'. In the example shown, the mounting holes 202a'-202b' are shown in a vertical orientation. The vertical orientation of the mounting holes 202a'-202b' may enable the light fixture 50 to be attached to the mounting plate 130. In an example, an upright sconce style light fixture 50 may be installed using vertically oriented screws. In the example shown, the wall plate adapter 130 may comprise mounting holes 202a'-202b' to enable the sconce 54 to attach to the base plate 130. For example, the wall plate adapter 130 may comprise mounting hardware to attach to a junction box and/or wall of the premises and the light sconce 54 may attach to the wall plate adapter 130. The orientation of the mounting holes 202a'-202b' on the base plate 130 may be varied according to the design criteria of a particular implementation.

In some embodiments, the adapter base plate 130 may implement a rotatable portion 220. The rotatable portion 220 may comprise the attachment location 132. The rotatable portion 220 may be configured to rotate independent of the orientation of the base plate 130. The rotatable portion 220 is shown having a circular shape. In an example, the rotatable portion 220 may be configured to rotate clockwise and/or counter-clockwise.

The attachment location 132 may rotate along with the rotatable portion 220. The rotatable portion 220 may enable the attachment location 132 to be rotated 180 degrees. In the example shown, the attachment location 132 may be located on the right side of the base plate 130. The security camera 104 may be attached to the attachment location 132 and the lens 120 may capture a field of view outward from the apparatus 100''' from a perspective to the right of the lamp shade 54. The rotatable portion 220 may be rotated to allow the placement of the security camera 104 to be adjusted.

Dotted shapes 222a-222b are shown. The dotted shapes 222a-222b may represent potential positions of the security camera 104 and/or the attachment location 132. In an example, the rotatable portion 220 may click into place (e.g., a connection socket) when rotated to the potential positions 222a-222b. When the rotatable portion 220 clicks into place at the potential positions 222a-222b, an electrical connection may be made between the security camera 104 and the power adapter 102.

In an example, the rotatable portion 220 may be rotated clockwise and may cause the attachment location 132 to be rotated to the top of the base plate 130 (e.g., at the security camera position 222a). At the top potential position 222a, the security camera 104 may be configured to extend over top of the lamp shade 54 (e.g., capture a field of view outward from the apparatus 100''' from a perspective above the light fixture 50). In an example, the rotatable portion 220 may be rotated clockwise and may cause the attachment location 132 to be rotated to the left side of the base plate 130 (e.g., to the camera position 222b). At the left potential position 222b, the security camera 104 may be configured to extend to the left of the lamp shade 54 (e.g., capture a field of view outward from the apparatus 100''' from a perspective from the left of the light fixture 50). The rotatable portion may be rotated to move the attachment location 132 to a bottom position of the rotatable portion 220. However, the security camera 104 may be blocked by the light fixture 50 when rotating the attachment location 132 to the bottom position.

Figure 13:
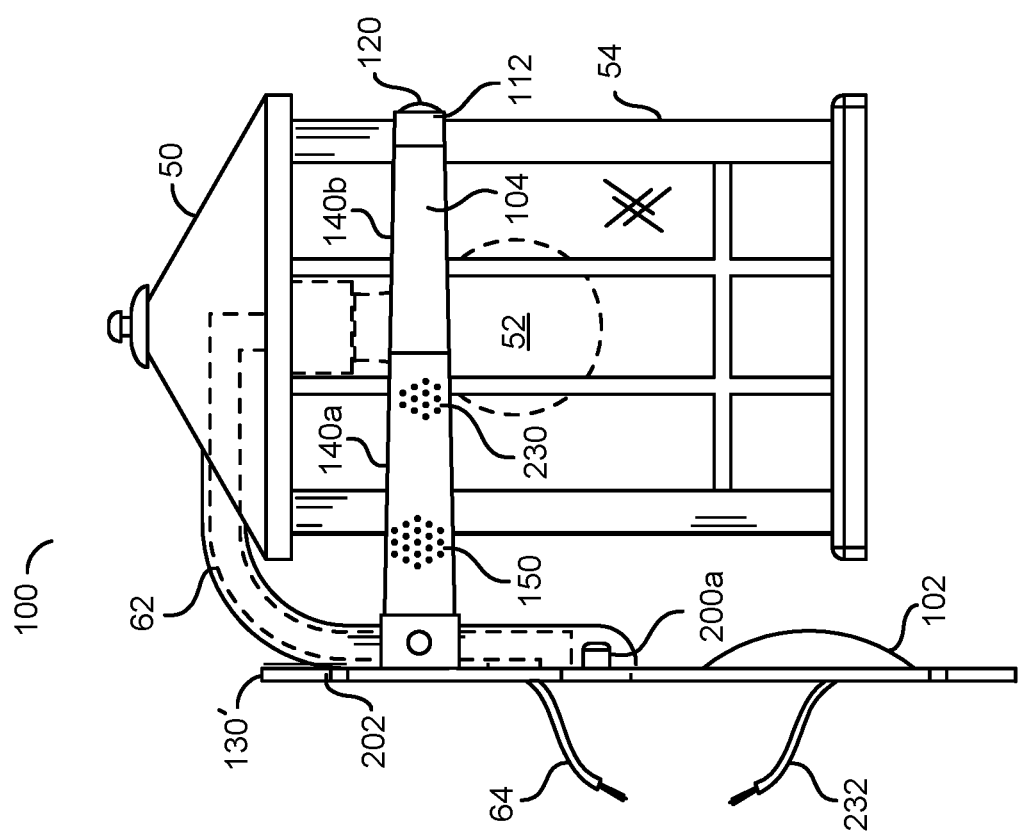
FIG. 13 is a diagram illustrating a thin base implementing a power adapter.

Referring to FIG. 13, a diagram illustrating a thin base implementing a power adapter is shown. A side view of the apparatus 100 is shown. The apparatus 100 may comprise the security camera 104 connected to the base plate 130'. The light fixture 50 is shown attached to the base plate 130'.

The base plate 130' is shown as ultra thin. In an example, the ultra thin base plate 130' may be less than one quarter of an inch thick. The ultra thin design of the base plate 130' may limit the placement locations for various components of the apparatus 100. In the example shown, the security camera 104 is shown attached to the base plate 130' at a location on the top half of the base plate 130'. When the security camera 104 is located to the top right/left side, the power adapter 102 may be implemented at the bottom of the base plate 130'. For example, the power adapter 102 may be located in the base plate 130' at a different location (e.g., the bottom half of the base plate 130') than the attachment location 132 for connecting the security camera 104 (e.g., the top half of the base plate 130') to ensure there is enough physical space for the components within the ultra thin base plate 130'.

The security camera 104 is shown alongside the lamps shade 54. In the example shown, the security camera 104 may be connected to the base plate 130' on a right side of the lamp shade 54. The portion 140b is shown extended from the portion 140a. The speaker grille 150 is shown on the portion 140a. A grille 230 is shown on the portion 140a. In an example, the grille 230 may implement openings for a microphone. In an example, one of the components 122a-122n may be a microphone and the microphone grille 230 may enable input audio to reach the microphone component.

The lens 120 is shown level with and/or beyond the front face of the sconce 54. The lens 120 may be even with the light sconce 54 after clearance for the left/right adjustment. With the lens 120 even with the light sconce 54 with clearance for left/right adjustment, the lens 120 may be configured to capture a field of view of the area near the light fixture 50 with a perspective from the right side of the lamp shade 54.

An attachment arm 62 is shown. The attachment arm 62 may be a component of the light fixture 50. The attachment arm 62 may be configured to connect the light fixture 50 to a mounting location. In an example, the attachment arm 62 may be part of the mounting hardware for the light fixture 50. The attachment arm 62 is shown connected to the base plate 130' over the opening 202. In an example, the mounting screw 200a may be configured to connect the attachment arm 62 to the base plate 130'.

The attachment arm 62 is shown comprising a hollow channel. The hollow channel of the attachment arm 62 may enable wiring to the light bulb 52. A wire 64 is shown. The wire 64 may connect to the light bulb 52. The wire 62 may extend through the attachment arm 62. The wire 64 is shown extending out behind the base plate 130'. The wire 64 may be fed through the opening 202 when the light fixture 50 is secured to the base plate 130'.

A wire 232 is shown extending from the base plate 130'. The wire 232 may provide a connection to the power adapter 102. In the example shown in FIG. 13, one wire 232 and one wire 64 are shown. However, the wire 232 and/or the wire 64 may be representative of multiple wires/cables that may provide a connection to/from the power adapter 102 and the light bulb 62. The wire 232 may be connected to the wire 64. The connection of the wire 232 and the wire 64 may enable the power adapter 102 to provide the signal DC_PWR and/or the signal DC_GND to the light bulb 52.

The power adapter 102 may be implemented within the base plate 130'. In the ultra-thin base plate 130' there may be a limited amount of physical space for the power adapter 102 to fit. The base plate 130' may implement a bulge to provide space for the power adapter 102. In the example shown, the bulge may be a dome shape. However, the size and/or shape of the space for the power adapter within the ultra-thin base plate 130' may be varied according to the design criteria of a particular implementation.

Figure 14:
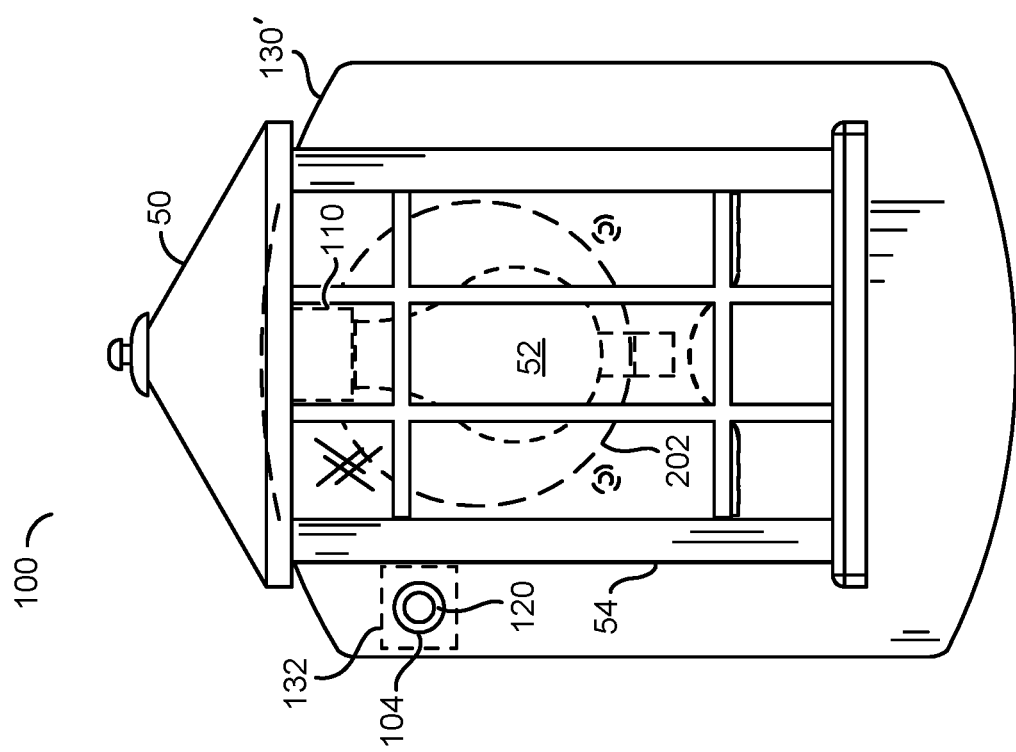
FIG. 14 is a diagram illustrating a front view of a light fixture.

Referring to FIG. 14, a diagram illustrating a front view of a light fixture is shown. A front view of the apparatus 100 is shown. The apparatus 100 may comprise the security camera 104 connected to the base plate 130'. The light fixture 50 is shown attached to the base plate 130'. The security camera 104 may be attached to the attachment location 132 and next to the lamp shade 54. The lens 120 may be directed out from the apparatus 100 and may capture a perspective from the right side of the lamp shade 54.

The light fixture 50 is shown mounted through the mounting hole 202. Generally, the mounting hole 202 may not be visible (e.g., the mounting hole 202 may be obscured by the light fixture 50). When looking at the light fixture 50, the security camera 104 may be discreet. The wiring that connects the power adapter 102 to the light fixture 50 may be hidden from view. The mechanical connection between the light fixture 50 and the base plate 130' may be hidden from view. For example, when looking at the apparatus 100 head-on the light fixture 50 may look like a conventional light fixture.

The bulge for the power adapter 102 may not be noticeable when viewed head-on. In some embodiments, the bulge in the ultra thin base plate 130' may be hidden (e.g., located behind) the lamp shade 54.

Figure 15:
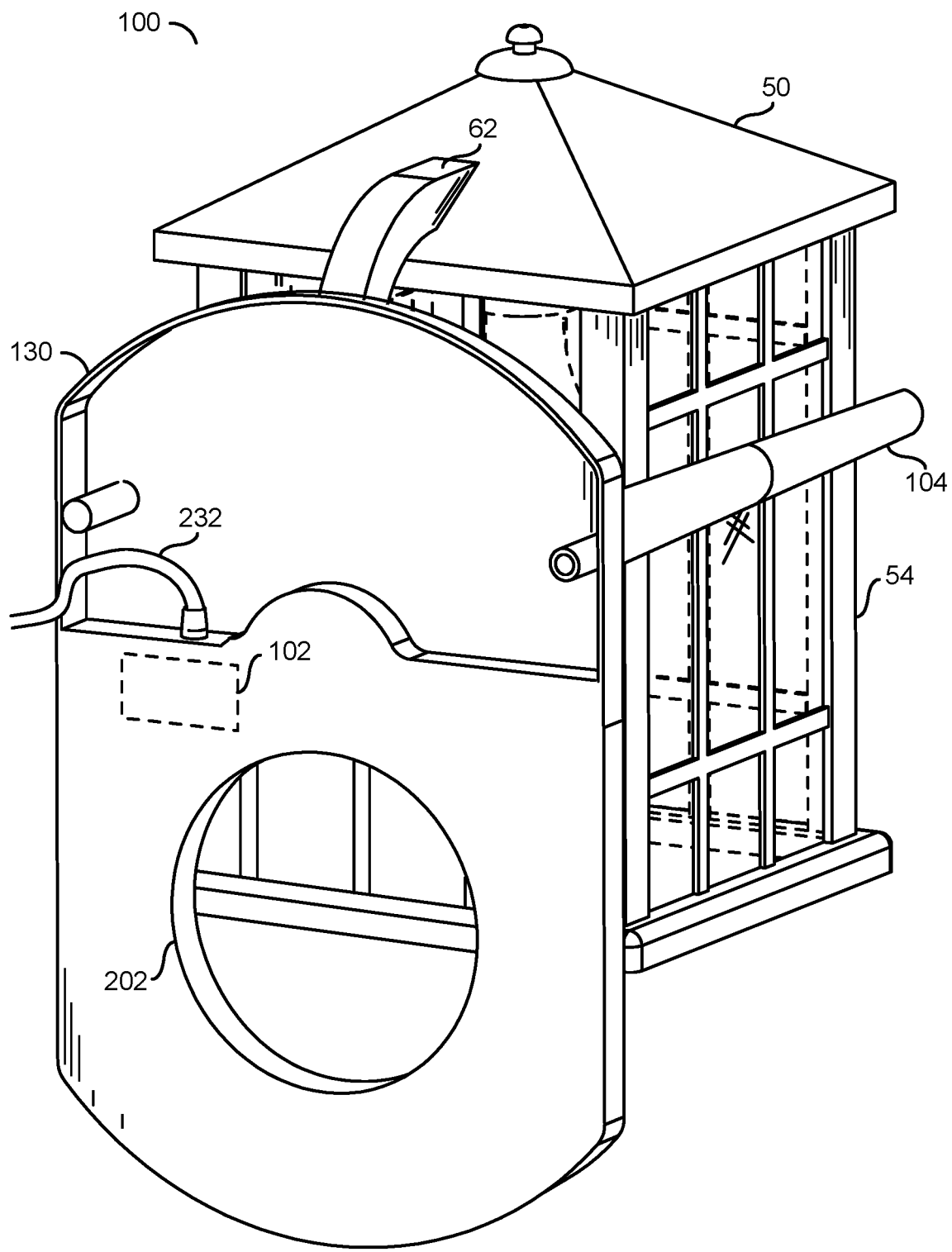
FIG. 15 is a diagram illustrating a rear view of a light fixture and a wall plate adapter.

Referring to FIG. 15, a diagram illustrating a rear view of a light fixture is shown. A rear view of the apparatus 100 is shown. The apparatus 100 may comprise the security camera 104 connected to the base plate 130. The light fixture 50 is shown on a front side of the base plate 130. The light fixture 50 may be positioned in front of the base plate 130 but may not yet be attached to the base plate 130. The security camera 104 may be attached to the front side of the base plate 130. The security camera 104 may be directed out from the front side of the apparatus 100 and may capture a perspective from the right side of the lamp shade 54. In some embodiments, the security camera 104 may implement multiple collapsing segments (e.g., the portions 140a-140b) for telescopic extension.

The mounting hole 202 is shown on the rear view of the wall plate adapter 130. The mounting hole 202 may provide a path through the wall plate adapter 130 to enable mounting hardware of the light fixture 50 to pass through the wall plate adapter 130 and reach a junction box and/or wall mount hardware. The attachment arm 62 is shown connected to the lamp shade 54. When installing the light fixture 50, the lamp shade 54 may be lowered so that the attachment arm 62 is visible through the mounting hole 202. The attachment arm 62 may be secured to the wall 60 through the mounting hole 202. The wiring 64 to the light bulb 52 may be fed through the mounting hole 202.

The power adapter 102 is shown. The power adapter 102 may be located within the base plate 130. The wire 232 is shown extending from the base plate 130. In an example, the wire 232 may connect to the power adapter 102 within the base plate 130. The wiring 64 from the attachment arm 62 may be exposed through the mounting hole 202 and may connect to the wire 232 on the rear side of the base plate 130.

Figure 16:
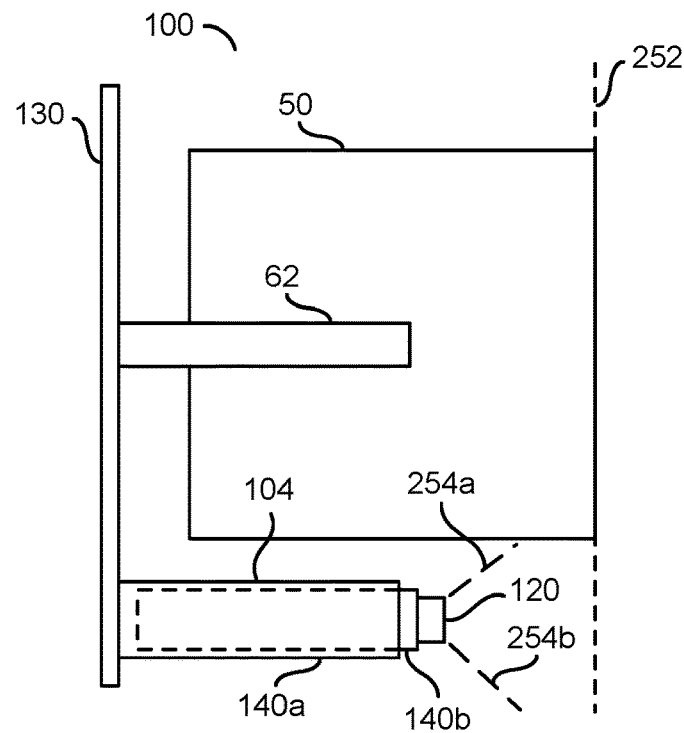
FIG. 16 is a diagram illustrating a top down view of a light fixture with a retracted side attachment.

Referring to FIG. 16, a diagram illustrating a top down view of the light fixture 50 with a retracted side attachment is shown. A top down view of the apparatus 100 is shown. The light fixture 50 may be attached to the base plate 130. The attachment arm 62 may connect the light fixture 50 to the base plate 130. The security camera 104 may be attached to the base plate 130. The security camera 104 may be located on a right side of the light fixture 50. Alternatively, the security camera 104 may be connected to the base plate 130 on a left side of the light fixture 50.

A dotted line 252 is shown. The dotted line 252 may be even with a front face of the light fixture 50. The dotted line 252 may represent a location of the level of the front face of the light fixture 50. For example, the distance from the base plate 130 to the level 252 may be equal to the distance from the base plate 130 to the front face of the light fixture 50.

The security camera 104 is shown retracted. In one example, in a retracted state, the security camera 104 may extend approximately six inches from the base plate 130. The portion 140b is shown implemented partially within the portion 140a. The components 122a-122n may be implemented within the portion 140a and/or the portion 140b.

The lens 120 is shown at an end of the portion 140b. When the security camera 104 is in the retracted state, the lens 120 may not reach the line 252. For example, the lens 120 may not be level with the front face of the light fixture 50.

Dotted lines 254a-254b are shown. The dotted lines 254a-254b may represent a field of view of the lens 120. The processor module 122a implemented within the security camera 104 may be configured to generate video data of the area within the field of view 254a-254b. In the retracted state, the field of view 254a-254b may be partially blocked by the light fixture 50. In the example shown, with the security camera 104 implemented on a right side of the light fixture 50, a portion of the field of view 254a-254b to the left of the lens 120 may be blocked by the light fixture 50.

Figure 17:
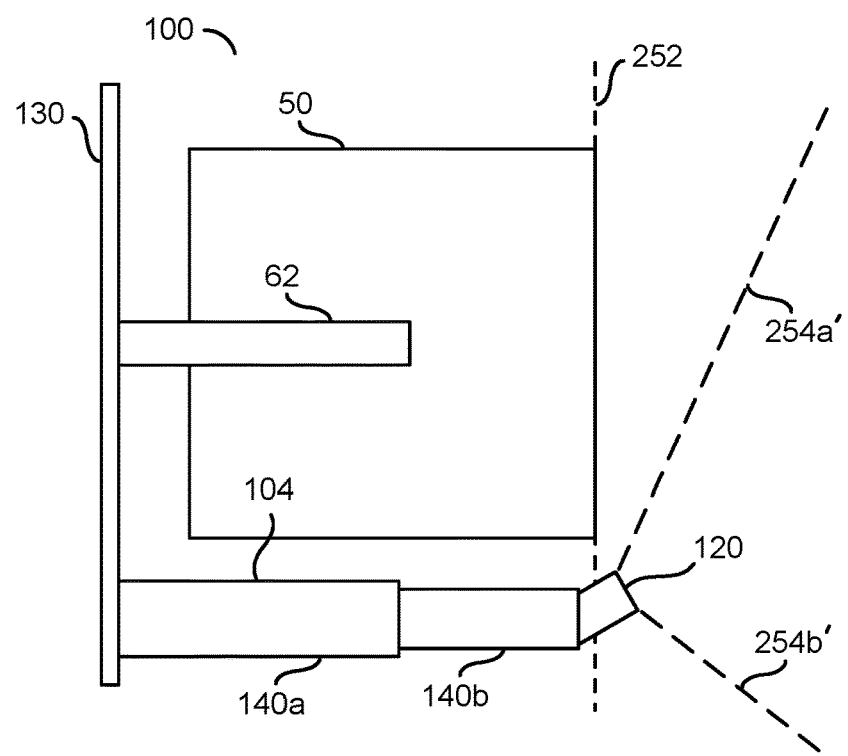
FIG. 17 is a diagram illustrating a top down view of a light fixture with a side attachment extended to provide a view beyond the light shade.

Referring to FIG. 17, a diagram illustrating a top down view of the light fixture 50 with a side attachment extended to provide a view beyond the light shade 54 is shown. A top down view of the apparatus 100 is shown. The light fixture 50 may be attached to the base plate 130. The attachment arm 62 may connect the light fixture 50 to the base plate 130. The security camera 104 may be attached to the base plate 130. The security camera 104 may be located on a right side of the light fixture 50. The line 252 is shown even with the front face of the light fixture 50. The security camera 104 is shown extended. In one example, in an extended state, the security camera 104 may extend approximately nine inches from the base plate 130. The portion 140a is shown implemented extending from the portion 140b. The components 122a-122n may be implemented within the portion 140a and/or the portion 140b.

The lens 120 is shown at an end of the portion 140a. When the security camera 104 is in the extended state, the lens 120 may reach the line 252. For example, the lens 120 may be level and/or be located beyond the front face of the light fixture 50. The lens 120 may be configured to be directed to the left or right. The portions 140a-140b may be configured to extend far enough to enable the lens 120 to extend past the front face of the light fixture 50 with enough clearance to direct the lens 120 to the left or right without being obstructed by the light fixture 50.

In the example shown, the security camera 104 is installed on a right side of the light fixture 50. The lens 120 is directed slightly to the left of center. The field of view 254a'-254b' is shown. When the security camera 104 is in the extended state, the field of view 254a'-254b' may not be obstructed by the light fixture 50. The security camera 104 may be extended to enable the lens 120 to have enough clearance from the light fixture 50 to be angled to the left or right without having the field of view 254a'-254b' blocked by the light fixture 50.

Figure 18:
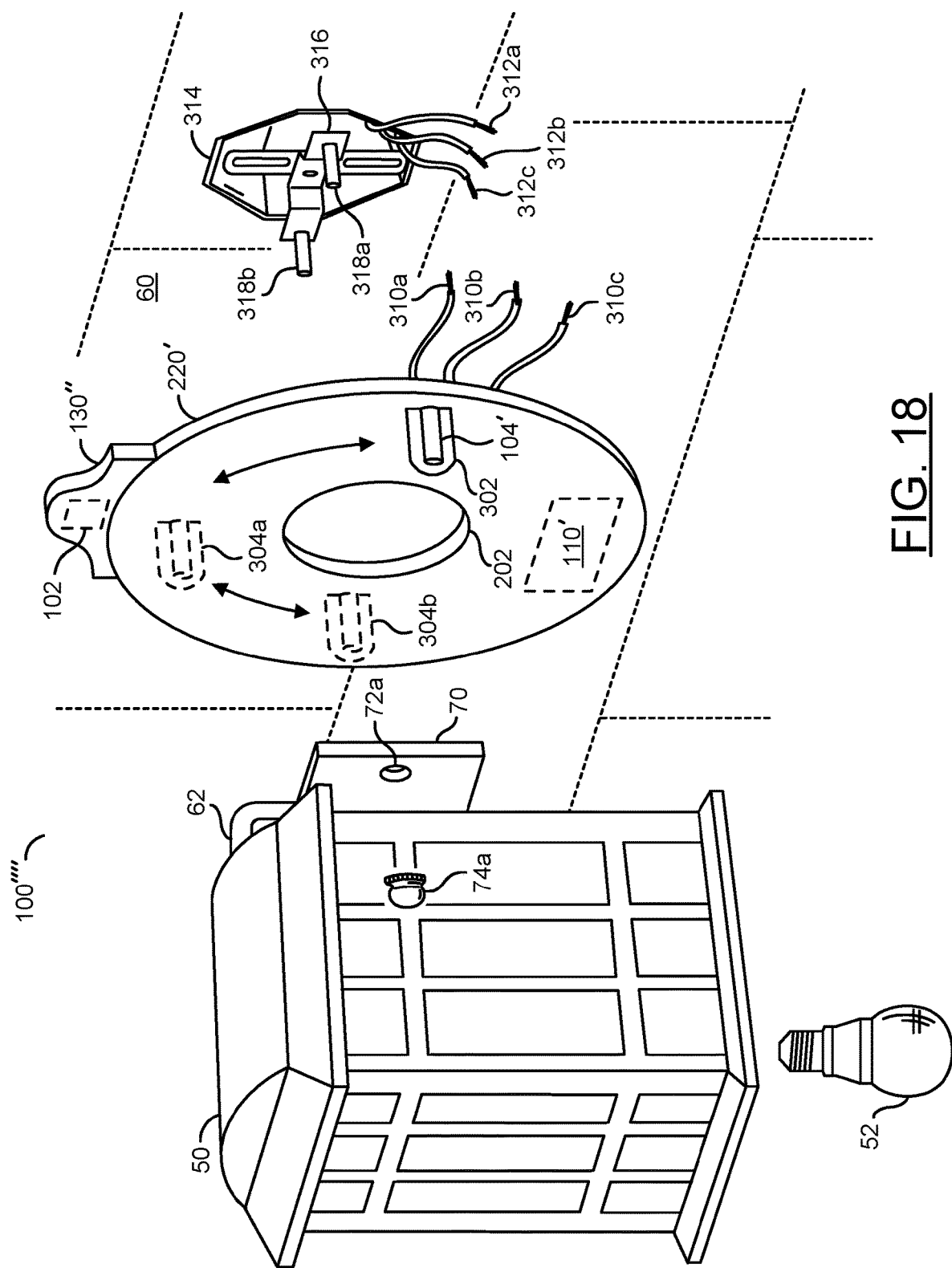
FIG. 18 is a diagram illustrating a base with a lens hood for the security camera.

Referring to FIG. 18, a diagram illustrating a base with a lens hood for the security camera is shown. An implementation of the apparatus 100'''' is shown. An exploded view of the light fixture 50 and the base plate 130'' being attached to the wall 60 is shown.

The light fixture 50 may comprise the light bulb 52 and the attachment arm 62. Mounting hardware 70 is shown. The mounting hardware 70 may be connected to the attachment arm 62. The mounting hardware 70 may comprise a screw hole 72a. The mounting hardware 70 may comprise multiple screw holes (e.g., 72a-72n). The screw holes 72a-72n may enable the light fixture to be mounted to the wall and/or the apparatus 100. A decorative cap 74a is shown. A number of decorative caps 74a-74n may be implemented corresponding with each of the screw holes 72a-72n.

The base plate 130'' may comprise the power adapter 102 and the rotatable plate 220'. The circuit board 110' is shown implemented within the rotatable plate 220'. The security camera 104' is shown attached to the rotatable plate 220'. In some embodiments, the security camera 104' may be implemented as a short 1 inch cylinder. The opening 202 is shown in the rotatable plate 202. The rotatable plate 202 may be configured to rotate about the opening 202.

A lens hood 302 is shown. The lens hood 302 may be located to the inside of the security camera 104' with respect to the rotatable plate 202' (e.g., the lens hood 302 may be implemented in between the security camera 104' and the opening 202). The lens hood 302 may be configured to protect the security camera 104' from glare from the light bulb 52. In an example, the lens hood 302 may be a rounded piece material (e.g., plastic, metal, etc.) approximately the same length as the security camera 104'. The size, material and/or shape of the lens hood 302 may be varied according to the design criteria of a particular implementation.

When the rotatable plate 220' is rotated, the security camera 104' and the lens hood 302 may be moved according to the rotation. Dotted shapes 304a-304b corresponding to the shapes of the lens hood 302 and the security camera 104' are shown. The dotted shapes 304a-304b may represent potential positions of the lens hood 302 and the security camera 104'. Two potential positions 304a-304b are shown. However, the lens hood 302 and the security camera 104' may be moved to any position along the rotation track by moving the rotatable plate 220'.

The rotatable plate 220' may be rotated to move the security camera 104' and the lens hood 302 to the top location 304a, the right side location 304b and/or any other location along the track of rotation. In the example shown, the security camera 104' and the lens hood 302 may be located on a left side of the light fixture 50 when the light fixture 50 is attached to the base plate 130''. In an example, rotating the rotatable plate 220' a one quarter turn counterclockwise may move the security camera 104' and the lens hood 302 to the top potential position 304a. In the top potential position 304a, the lens hood 302 may be beneath the security camera 104' and the security camera 104' and the lens hood 302 may be located above the light fixture 50. In another example, rotating the rotatable plate 220' farther another one quarter turn counterclockwise may move the security camera 104' and the lens hood 302 to the right potential position 304b. In the right potential position 304b, the lens hood 302 may be located to the left of the security camera 104' (e.g., in between the security camera 104' and the light fixture 50) and the security camera 104' may be located on a right side of the light fixture 50. The security camera 104' and the lens hood 302 may be rotated to a bottom position, but would be blocked by the light fixture 50 in the bottom position.

The power adapter 102 is shown implemented within the base plate 130'' (e.g., at a top portion above the rotatable plate 220'). In some embodiments, the base plate 130'' may be rotated 180 degrees (e.g., so that the power adapter is below the rotatable plate 220'). In the example shown, the circuit board 110' may be implemented within the rotatable plate 220' (e.g., a bottom portion of the wall plate adapter 130''). In some embodiments, the circuit board 110' may be implemented near the power adapter 102. Generally, the rotatable plate 220' may be rotated by the user to set the position of the security camera 104' before the wiring is attached. The rotatable plate 220' may be rotated to the desired position by the user and then the wiring may be connected (e.g., the signal AC_OUT to the light fixture 50 and the signal DC_PWR and the signal DC_GND to the security camera 104' and/or any connections from the camera module 112 to the video processor 122a) to prevent any electrical disconnections by rotating the wires (e.g., changing the position of the security camera 104' may stretch the wires is connected when rotating the rotatable plate 220').

In the example implementation of the apparatus 100'''', the security camera 104' may be implemented with a smaller size (e.g., without the circuit board 110'). To enable functionality such as the video processing, the video data captured by the security camera 104' may be communicated from the security camera 104' to the circuit board 110'. Implementing the visor 302 with the camera module 104' and the circuitry 110' (e.g., the processor, lens, sensor) within the wall plate 130" may be useful when the light fixture 50 is mounted close to the door (e.g., about 1 foot away).

The mounting hole 202 may be implemented in the middle of the rotatable plate 220'. Wiring 310a-310c is shown. While the wiring 310a-310c is shown connected to the rotatable plate 220', the wiring 310a-310c may comprise wires from the power adapter 102, the circuit board 110' and/or the mounting hardware 70. For example, the wiring 310a-310c may comprise one or more of the wires represented as the wire 64 and/or the wire 232 shown in association with FIG. 13. In an example, the wiring from the mounting hardware (e.g., the wire 64) may be fed through the mounting hole 202 when the light fixture 50 is installed with the base plate 130". The wiring from the mounting hardware may be connected to the wiring from the power adapter 102 (e.g., to enable the connection of the signal AC_IN).

Supply wires 312a-312c are shown coming from a junction box 314. The junction box 314 is shown installed in the wall 60. The junction box 314 may comprise wall mount support hardware 316 and/or the mounting screws 318a-318b. The supply wires 312a-312c may provide the power supply from the premises. The supply wires 312a-312c may be an electrical connection for the light fixture 50 that may be used by the apparatus 100. In an example, the supply wires 312a-312c may be configured to provide the signal AC_IN. The mounting hole 202 may enable the wiring 310a-310c to connect to the supply wiring 312a-312c from the junction box 314. Connecting the wires 310a-310c to the supply wiring 312a-312c may enable the power adapter 102 to receive the signal AC_IN.

The support hardware 316 may be configured to provide structural support from the wall 60 for the base plate 130" and/or the light fixture 50. The mounting screws 318a-318b may pass through the opening 202 when the base plate 130" is pushed up against the wall 60. The mounting screws 318a-318b may connect with the screw holes 72a-72b of the mounting hardware 70. The decorative cap 74a may cover the mounting screw 318a when the light fixture 50 is attached. In some embodiments, the base plate 130" may be held in place by the pressure created by the attachment between the light fixture 50 and the junction box 314. In some embodiments, the base plate 130" may provide mounting holes for the mounting screws 318a-318b and the mounting screws may be used to secure both the base plate 130" and the light fixture 50.

Figure 19:
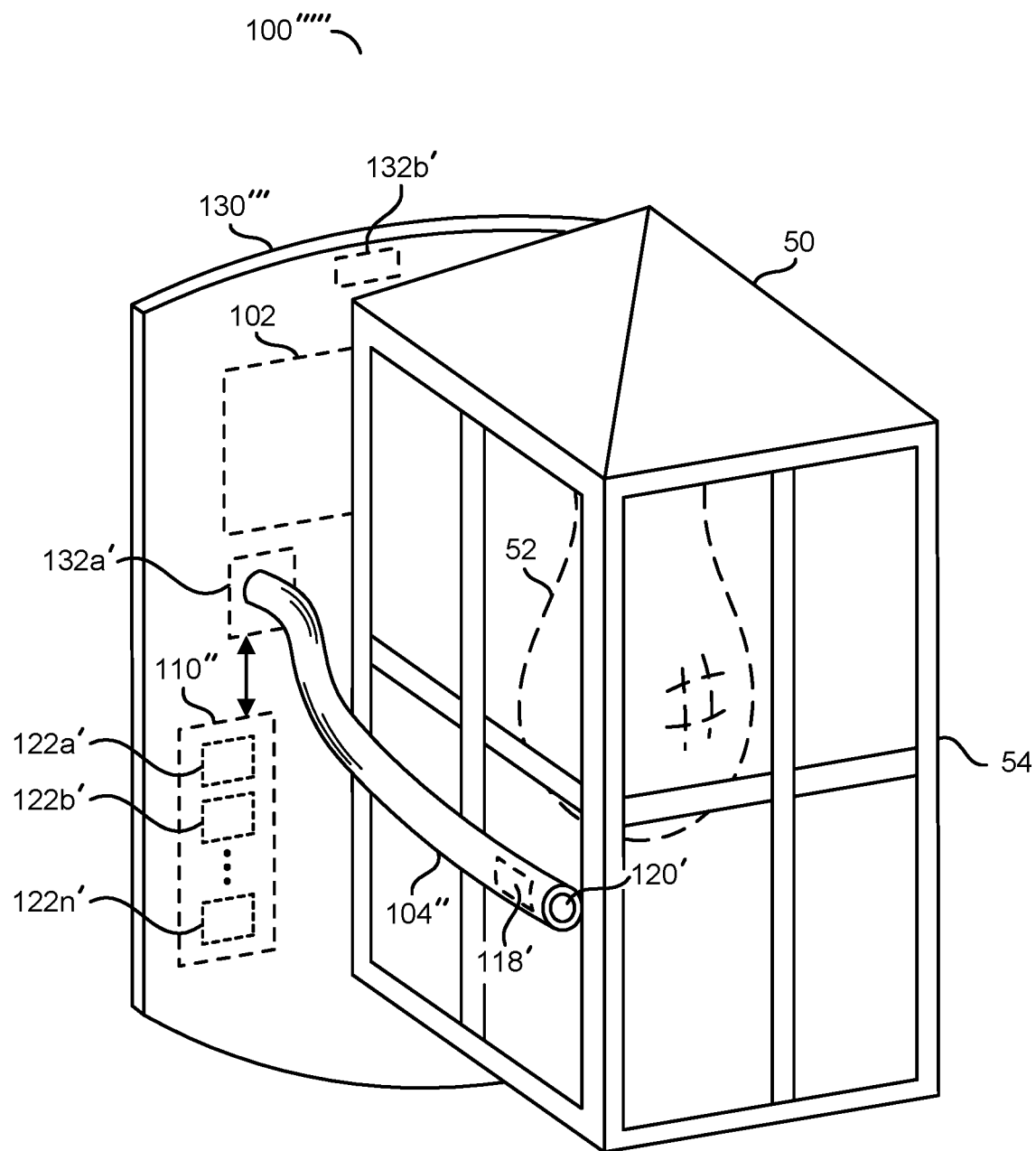
FIG. 19 is a diagram illustrating a wall plate adapter with internal circuitry and a flexible security camera.

Referring to FIG. 19, a diagram illustrating a wall plate adapter with internal circuitry and a flexible security camera is shown. The apparatus 100''''' is shown comprising the base plate 130''' and the security camera 104". The light fixture 50 is shown attached to the base plate 130''' (e.g., mounted through the mounting hole 202). The light bulb 52 is shown within the lampshade 54 of the light fixture 50. The power adapter 102 is shown within the base plate 130'''.

The mounting location 132a' is shown to the right of the light sconce 54. An alternate mounting location 132b' is shown located above the light sconce 54. The security camera 104" is shown attached to the attachment location 132a'.

The security camera 104" may comprise the image sensor 118' and the lens 120'. The security camera 104" may be implemented as a flexible tube. The flexible tube may enable the security camera 104" to have enough rigidity for support and to stay in position while also enabling the shape of the security camera 104" and/or the direction of the lens 120' to be changed. For example, a user may hand-adjust the FOV of the camera module 112' by flexing the shape of the security camera 104". In an example, if the security camera 104" is attached at the attachment location 132b', the security camera 104" may be flexed so that the lens 120' is located above the light fixture 50 (e.g., by bending the security camera 104" upwards and then outwards above the light fixture 50), the security camera 104" may be flexed so that the lens 120' is located to the right of the light fixture 50 (e.g., by bending the security camera 104" to the right and then outwards beside the security camera 104") and/or the security camera 104" may be flexed so that the lens 120' is located to the left of the light fixture 50 (e.g., by bending the security camera 104" to the left and then outwards beside the security camera 104"). The shape of the security camera 104" may be flexed according to the design criteria of a particular implementation.

In the example shown, the flexible tube security camera 104" may not comprise the circuitry 110". In some embodiments, the circuitry 110" may be implemented within the wall plate adapter 130'''. For example, a connection may be implemented between the image sensor 118' and the circuitry 110" (e.g., the ribbon cable 116 may connect the sensor module 118' to the attachment location 132a'). The processor module (e.g., the component 122a') may be located in the wall plate 130''', and only the lens 120' and the sensor module 118' may be within the security camera 104" extended to the front of the light sconce 54. Other of the components 122a'-122n' (e.g., the speaker, the microphone, the wireless communication module, etc.) may be implemented within the base plate 130'''. With the circuit 110" implemented within the base plate 130''', the attachment location 132a' may not implement a connector for the signal CTRL (e.g., the signal CTRL may be communicated from the circuit board 110" to the power adapter 102 within the base plate 130'''). The security camera 104" may be implemented small (e.g., thinner than the 1 inch diameter of the security camera module 104 shown in association with FIG. 5). In one example, the security camera 104" may be a goose-neck implementation. In one example, a high speed video connection (e.g., MIPI) may be implemented between the security camera 104" and the circuitry 110".

Figure 20:
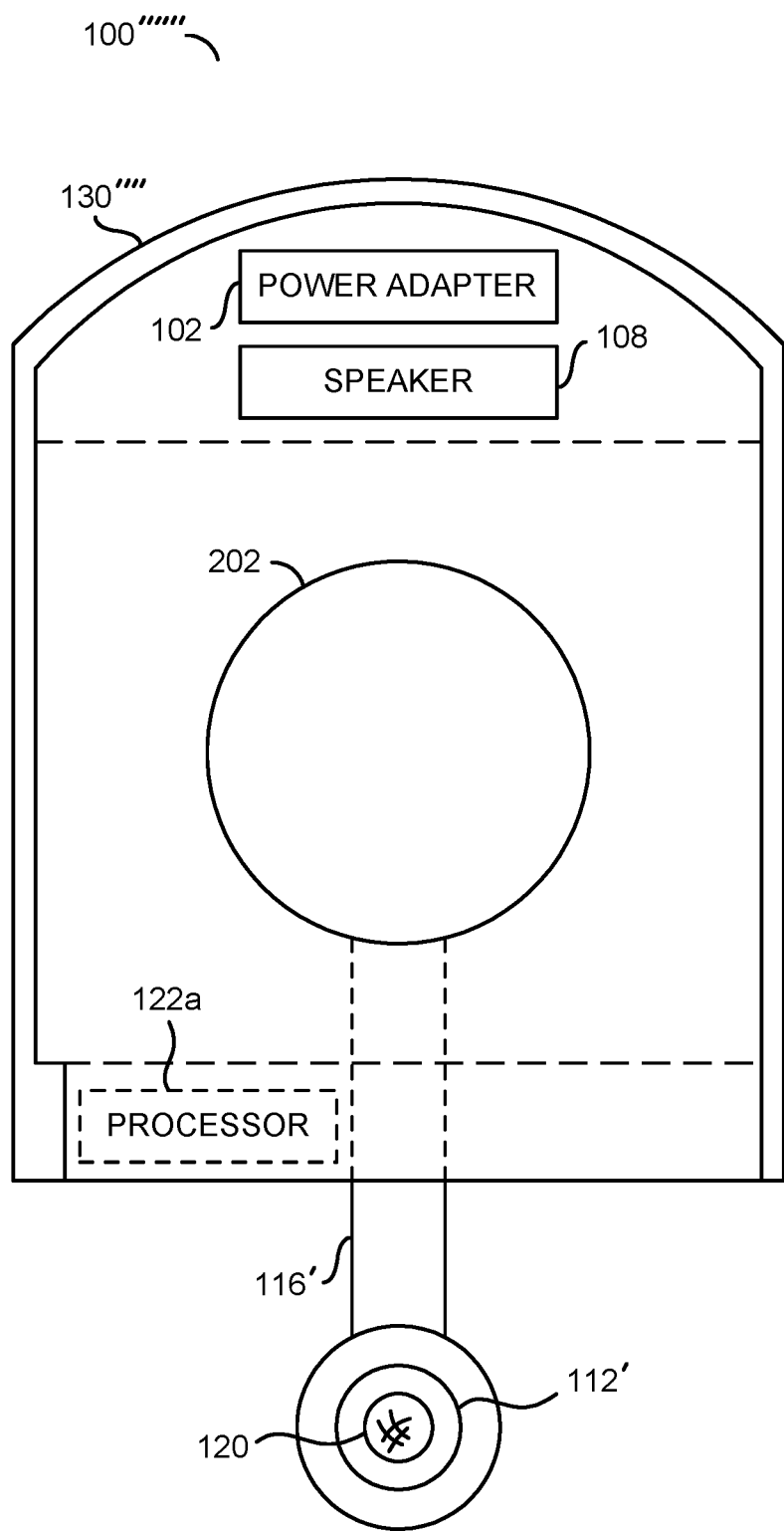
FIG. 20 is a diagram illustrating a wall plate adapter with a ribbon cable extending down to a lens module.

Referring to FIG. 20, a diagram illustrating a wall plate adapter with a ribbon cable extending down to a lens module is shown. A front view of the apparatus 100'''''' is shown. The apparatus 100'''''' may comprise the base plate 130''''. The apparatus 100'''''' is shown without the light fixture 50 attached to the base plate 130''''.

The base plate 130'''' may comprise the power adapter 102, the speaker 108, the processor 122a and/or the mounting hole 202. Other of the components 122a-122n may be implemented within the base plate 130''''. The cable 116' is shown extending from the base plate 130''''. The cable 116' is shown connected to the base plate 130'''' near the opening 202. The cable 116' is shown extending below the base plate 130''''. In an example, the cable 116' may connect to the circuit board 110 (not shown) to enable a high speed video data transfer from the camera module 112' and the video processor 122a.

The camera module 112' is shown connected to the cable 116'. The lens 120 is shown at the end of the camera module 112'. Attaching the camera module 112' to the cable 116' may enable the camera module 112' to extend below the base plate 130''''. In an example, when the light fixture 50 is attached to the base plate 130'''', the camera module 112' may be extended by the cable 116' to a location that may be below a bottom level of the lamp fixture 50.

In an example, the base plate 130"" may be approximately 8 inches tall and 5 inches wide. The base plate 130"" may be approximately one quarter of an inch thick. In some embodiments, a top portion of the base plate 130"" may be thicker that the rest of the base plate 130"" to accommodate the thickness of the power adapter 102 and a bottom portion of the base plate 130"" may be approximately a quarter of an inch thick. The power adapter 102 may comprise four 120 volt wires and 2 low voltage wires (not shown).

The power adapter 102 implemented within the base plate 130"" may be approximately one inch thick and three inches long. The speaker 108 may be an optional component of the apparatus 100""'. The speaker 108 may be approximately one inch thick and two inches in diameter. The speaker 108 may be implemented with two wires. The two wires for the speaker 108 may be low voltage and low speed wires. For example, the wires for the speaker 108 may communicate the signal AUDIO.

The mounting hole 202 may be approximately four inches in diameter. The mounting hole 202 may be large enough to expose the junction box 314 on the wall 60 behind the base plate 130"". Exposing the junction box 314 may enable the power supply wires 312a-312c to be accessed to connect to the power adapter 102.

The processor 122a may be configured to generate video data from the images captured by the camera module 112'. The processor 122a may be configured to perform object detection to recognize objects, determine the characteristics (e.g., color, speed, size, etc.) and/or determine the behavior of objects (e.g., detect a person stealing a delivered package, detect a person attempting to break and enter, detect a friendly visitor, etc.). The processor 122a may be configured to perform face recognition (e.g., determine whether a person is recognized as a known person). The processor 122a may be further configured to make decisions and/or generate output in response to analyzing the video frames (e.g., sound an alarm when a burglar is detected, provide a friendly greeting to a visitor, communicate a notification to a homeowner when a package is delivered, etc.). For example, the processor 122a may be configured to generate the signal CTRL in response to the decisions made. The processor 122a may enable wireless communication for internet connectivity. The internet connectivity may enable the processor 122a to send alerts to the homeowner and/or receive remote instructions from a homeowner (e.g., provide an API that may be used with the companion app 106 for the smartphone 42). The functionality of the processor 122a may be varied according to the design criteria of a particular implementation.

The cable 116' may be approximately one and a half inches wide, one inch thick and five inches long. The cable 116' may be connected to the circuit board 110 and/or to an interface of the processor 122a. The cable 116' may provide a high-speed flexible cable with many wires to the camera module 112'. In an example, the cable 116' may be a PCB ribbon cable for transmitting high-definition video data. The cable 116' may have a three inch adjustment to lower/raise the level of the camera module 112'. The cable 116' may slide up/down with respect to the base plate 130"" to help match the style of the light fixture 50. For example, if the light fixture 50 hangs lower, the camera module 112' may be mounted lower by extending the cable 116' and if the light fixture 50 hangs higher, the camera module 112' may be mounted higher by raising the cable 116'. The cable 116' may be implemented in a covered channel (e.g., a weatherproof material). Implementing the covered channel may enable the cable 116' to connect to the camera module 112' without an exposed wire.

The camera module 112' may be implemented as a housing for the lens 120 and/or the camera sensor 118. In an example, the camera module 112' may be a spherical aluminum ball (or partial ball) having a two inch diameter. The camera module 112' may be rotated to adjust the field of view 254a-254b. The partially spherical shape of the camera module 112' may enable the rotation in any direction (e.g., up, down, left, right). The camera module 112' may comprise other sensors (e.g., a PIR motion sensor, an air quality sensor, a thermometer, etc.).

Figures 21, 22:
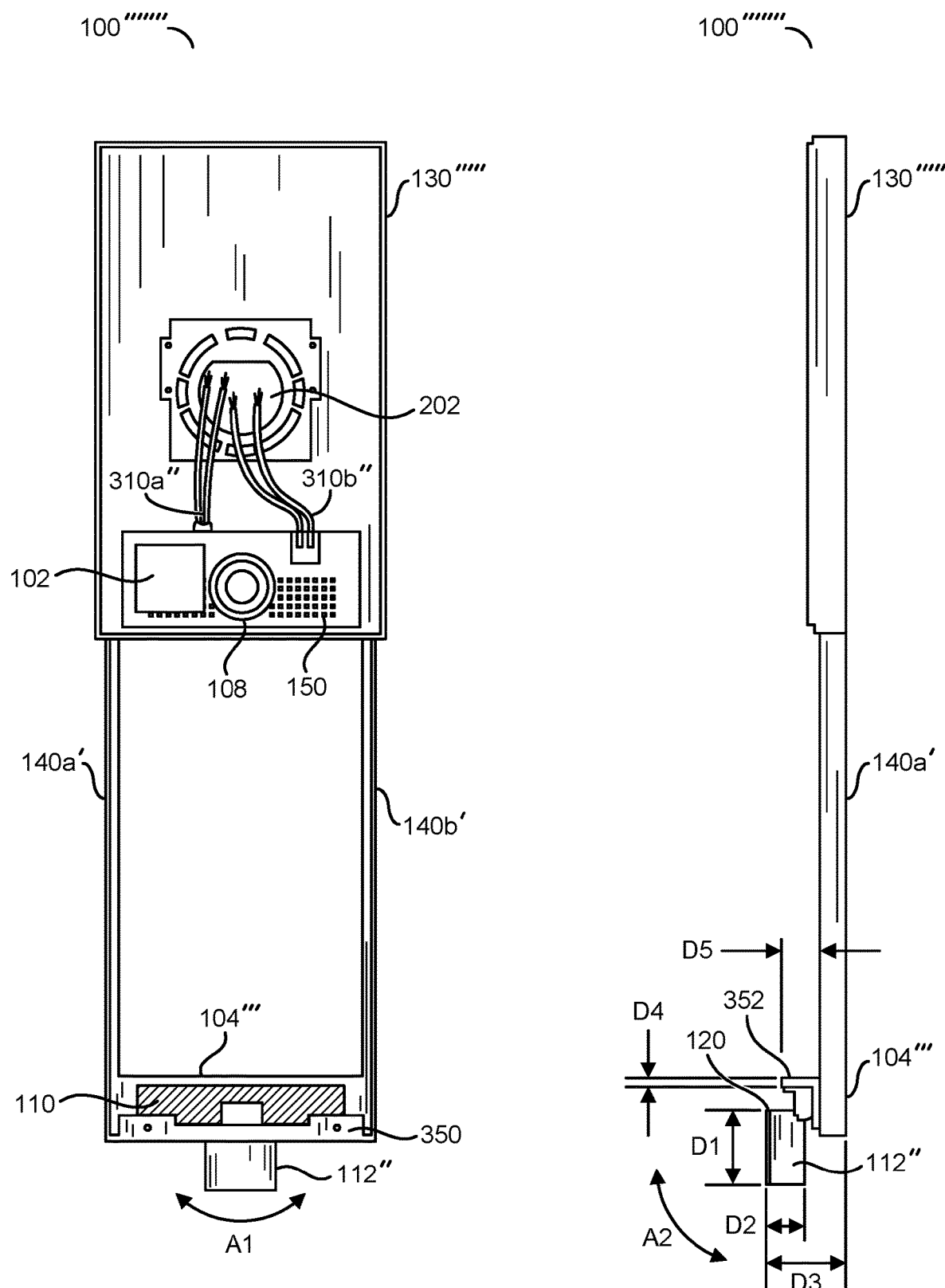
FIG. 21 is a diagram illustrating a rear view of the wall plate adapter with a rectangular extension for the security camera.
FIG. 22 is a diagram illustrating a side view of the wall plate adapter with a rectangular extension for the security camera.

Referring to FIG. 21, a diagram illustrating a rear view of the wall plate adapter with a rectangular extension for the security camera is shown. A rear view of the apparatus 100""" is shown. The apparatus 100""" may comprise the base plate 130"" and the security camera 104'". The security camera 104'" may be implemented as a rectangular extension.

The base plate 130"" may comprise the power adapter 102, the speaker 108, the speaker grille 150, the wires 310a", the wires 310b" and/or the mounting hole 202. The base plate 130"" may have a thin implementation (e.g., approximately one quarter of an inch in thickness), which may limit the placement location options for the power adapter 102 and/or the speaker 108. The power adapter 102 and the speaker 108 may be implemented in a space located behind the speaker grille 150.

The pair of wires 310a" and the pair of wires 310b" may be connected to the power adapter 102. One of the pairs of wires 310a"-310b" may be connected to one or more of the supply wires 312a-312c from the junction box 314. One of the pairs of wires 310a"-310b" may be connected to the wire 64 from the mounting hardware 70. The pairs of wires 310a"-310b" may be configured to receive the signal AC_IN and generate the signal AC_OUT. The pairs of wires 310a"-310b" may be configured to extend from the power adapter 102 and through the opening 202.

The extendable portions 140a'-140b' are shown connecting the base plate 130"" to the security camera 104'". The extendable portions 140a'-140b' may extend from and retract into the base plate 130"". The extendable portions 140a'-140b' may be configured to provide an adjustable height for the apparatus 100""" (e.g., adjust a distance between the base plate 130"" and the security camera 104'"). By sliding the extendable portions 140a'-140b' into and out from the base plate 130"", how far the security camera 104'" extends from the base plate 130"" may be adjusted.

In the example shown, the apparatus 100""" is shown with the security camera 104'" below the base plate 130"". The apparatus 100""" may be turned upside down (e.g., rotated 180 degrees) and the security camera 104'" may be located above the base plate 130"" (e.g., extending the extendable portions 140a'-140b' may cause the security camera 104'" to extend farther above the base plate 130""). The homeowner may decide to install the apparatus 100""" with the security camera 104'" hanging down or extended above the base plate 130"" based on the style of the light fixture 50 that may be attached to the apparatus 100""".

The circuit board 110 is shown implemented within the security camera 104'". The circuit board 110 may receive power from the power adapter 102 (e.g., the signal DC_PWR and the signal DC_GND). The circuit board 110 may provide the control signal CTRL for the power adapter 102. In an example, low voltage wires may be connected from the circuit 110 to the power adapter 102 along the extendable portions 140a'-140b'.

The camera module 112" is shown attached to the security camera 104'". The camera module 112" may hang down from the front face of the security camera 104'". The camera module 112" may rotate with respect to the security camera 104'".

A curve A1 is shown. The curve A1 may represent a left/right rotation of the camera module 112". In an example, the camera module 112" may be configured to rotate 40 degrees to the left or right. Rotating the camera module 112" may adjust the field of view captured by the camera module 112". Video data of the field of view captured by the camera module 112" may be processed by the processor 122a implemented on the circuit board 110.

A bracket 350 is shown connected to the security camera 104'". The bracket 350 may be an L bracket. The L bracket 350 may be configured to connect to the wall 60. Connecting the L bracket 350 to the wall 60 may enable the security camera 104'" to be held securely in place. In an example, the homeowner may extend the extendable portions 140a'-140b' to achieve the desired distance between the base plate 130'''' and the security camera 104'" (e.g., a distance such that the field of view 254a-254b of the camera module 112" is not obstructed by the light fixture 50). When the desired distance is achieved, the homeowner may attach (e.g., using screws) the L bracket 350 to the wall 60. Attaching the L bracket 350 to the wall 60 may prevent the position of the security camera 104'" from being moved.

Referring to FIG. 22, a diagram illustrating a side view of the wall plate adapter with a rectangular extension for the security camera is shown. A side view (e.g., a left side) of the apparatus 100'''''' is shown. The apparatus 100'''''' may comprise the base plate 130'''', the extendable portions 140a'-140b' and the security camera 104'". The apparatus 100'''''' is shown without the light fixture attached. The security camera 104'" may be implemented as a rectangular extension with an orientation underneath the base plate 130''''. The lens 120 may be visible on the side profile view of the camera module 112".

A ridge 352 is shown. The ridge 352 may enable the camera module 112" to hang slightly in front of the security camera 104'". By hanging at an offset position slightly in front of the security camera 104'", the apparatus 100'''''' may have a thin profile. By hanging at an offset position slightly in front of the security camera 104'", the camera module 112" may have enough room to tilt forwards and backwards.

A curve A2 is shown. The curve A2 may represent a forward or backward tilt of the camera module 112". In an example, the camera module 112" may tilt backwards (e.g., so the lens 120 is directed at a downwards angle) 40 degrees. In another example, the camera module 112" may tilt forwards (e.g., so the lens 120 is directed at an upwards angle) 40 degrees. When the security camera 104'" is oriented above the base plate 130'''', tilting the camera module 112" forwards may cause the lens 120 to be directed at a downward angle.

A distance D1 is shown. The distance D1 may represent a height of the camera module 112". In one example, the height of the camera module 112" may be approximately 1.88 inches. A distance D2 is shown. The distance D2 may represent a depth of the camera module 112". In one example, the depth of the camera module 112" may be approximately 0.91 inches. A distance D3 is shown. The distance D3 may represent a total depth of the apparatus 100'''''' including the offset distance of the camera module 112". In an example, the distance D3 may be approximately 1.98 inches. A distance D4 is shown. The distance D4 may represent a thickness of the ridge 352. In one example, the distance of the ridge 352 may be approximately one quarter inch. A distance D5 is shown. The distance D5 may represent a depth of the ridge 352 (e.g., how far the ridge 352 extends from the security camera 104'"). In an example, the distance D5 may be approximately 0.91 inches. The measurements of the distances D1-D5 may be varied according to the design criteria of a particular implementation.

Figure 23:
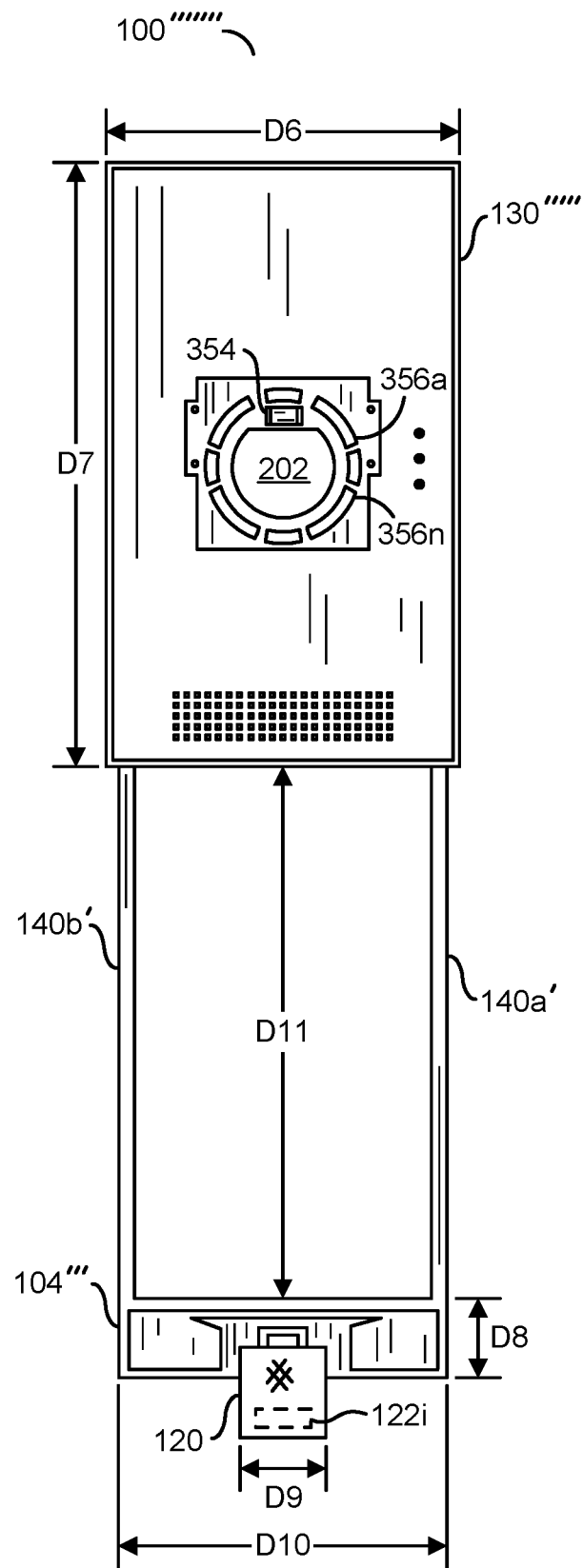
FIG. 23 is a diagram illustrating a front view of the wall plate adapter with a rectangular extension for the security camera.

Referring to FIG. 23, a diagram illustrating a front view of the wall plate adapter with a rectangular extension for the security camera is shown. A front view of the apparatus 100'''''' is shown. The apparatus 100'''''' may comprise the base plate 130'''', the extendable portions 140a'-140b' and the security camera 104'". The apparatus 100'''''' is shown without the light fixture attached. The security camera 104'" may be implemented as a rectangular extension with an orientation underneath the base plate 130''''.

The speaker grille 150 and the mounting hole 202 are shown on the front face of the base plate 130''''. A bubble level 354 is shown near the mounting hole 202. The bubble level 354 may provide an indicator to the homeowner that the apparatus 100'''''' is installed horizontally level to the wall 60. The bubble level 354 may be located near the opening 202 so that the bubble level 354 may be covered by the mounting hardware 70 when the light fixture 50 is installed. Covering the bubble level 354 may enable the bubble level 354 to provide a helpful guide when installing the apparatus 100'''''' that may be hidden after the light fixture 50 is installed.

Mounting locations 356a-356n are shown. The mounting locations 356a-356n are shown positioned around the mounting opening 202. The mounting locations 356a-356n may be configured to enable the light fixture 50 to be attached to the base plate 130'''' and/or the support hardware 316 of the junction box 314 to be attached to the base plate 130''''. The mounting locations 356a-356n may be wide enough to provide openings for mounting screws to pass through and narrow enough allow nuts to hold the mounting screws to the mounting locations 356a-356n. The mounting locations 356a-356n may be arranged around the mounting opening 202 to enable any orientation, shape, size and/or style of mounting hardware 70 and/or support hardware 316 to be attached. Similar to the bubble level 354, the mounting locations 356a-356n may be covered when the light fixture 50 is installed.

The mounting locations 356a-356n may be configured to enable the mechanical connection (e.g., the support) for the wall 60, the base plate 130'''' and/or the light fixture 50. The opening 202 may provide space for the electrical connections between the junction box 314, the power adapter 102 and/or the light fixture 50 to be connected. The opening 202 and the mounting locations 356a-356n may be covered by the light fixture 50 when the light fixture 50 is installed.

A front side of the lens 120 is shown attached to the security camera 104'". The circuit 122i is shown implemented within the camera module 112" (e.g., behind the lens 120). The circuit 122i may be representative of one or more of the components connected to the circuit board 110. In one example, the component 122i may be a PIR motion sensor. In another example, the component 122i may be a microphone. The number and/or type of components 122a-122n implemented on the circuit board 110 and/or implemented within the camera module 112" and connected to the circuit board 110 may be varied according to the design criteria of a particular implementation.

A distance D6 is shown. The distance D6 may represent a width of the base plate 130''''. In one example, the distance D6 may be approximately 7 inches. A distance D7 is shown. The distance D7 may represent a height of the base plate 130''''. In one example, the distance D7 may be approximately 11 inches. A distance D8 is shown. The distance D8 may represent a height of the security camera 104'''. In one example, the distance D8 may be approximately 1.62 inches. A distance D9 is shown. The distance D9 may represent a width of the camera module 112''. In one example, the distance D9 may be approximately 0.91 inches. A distance D10 is shown. The distance D10 may represent a width of the security camera 104'''. In one example, the distance D10 may be approximately 6.52 inches. A distance D11 is shown. The distance D11 may represent a maximum extension of the extendable portions 140a'-140b' (e.g., a maximum distance between the base plate 130'''' and the security camera 104'''). In one example, the distance D11 may be approximately 10.5 inches. For example, the extendable portions 140a'-140b' may be extended and/or retracted so that the security camera 104''' may be positioned anywhere from zero to 10.5 inches from the base plate 130''''. The measurements of the distances D6-D11 may be varied according to the design criteria of a particular implementation.

Generally, the wall plate adapter 130 may be configured to enable the security camera 104 and/or the camera module 112 to be located to the left or right side of the adapter wall plate 130. In some embodiments, the security camera 104 may be implemented as the cylindrical tube comprising the circuitry 110 and the camera module 112 (e.g., the video processor, the camera module and lens all within one device). For example, the cylindrical tube 104 may comprise the processor module 122a, the camera sensor 118 and the lens 120 and have a circuit board 110 (e.g., 6 inch×1 inch PCB) connected by a short (e.g., 1 inch) flex cable 116 to the camera module 112. The security camera 104 may be approximately a 6 inch long cylinder that may be extended to as much as 9 inches out and may fit almost all light sconce designs.

In some embodiments, the security camera 104 may be implemented as the camera module 112 with the circuitry 110 within the adapter wall plate 130. For example, the processor module 122a' may be within the wall plate 130''' with a high speed connection (e.g., MIPI, which is a standard for web cams) to the sensor module 118' and/or the lens 120'. The security camera 104'' may be implemented as a conduit for the MIPI cable and may be a goose-neck tube (or other type of small tube) that may provide the up/down, left/right adjustment of the lens 120'.

In some embodiments, the camera module 104' may be implemented without extending past the front face of the light sconce 54 and the lens hood 302 may be implemented to reduce glare. For example, all the functionality (e.g., the security camera module 104' and the circuitry 110') may be implemented within (or partially within) the base plate 130''. The long visor (e.g., lens hood) 302 may be implemented to minimize and/or reduce glare from the light bulb 52 within the light sconce 54. For example, in some implementations, the user may not mind having the FOV of the security camera 104' partially blocked by the light sconce 54.

In some embodiments, the entire adapter wall plate 130 may be rotated 180 degrees in order to have one design for both left and right placement of the security camera 104 with respect to the light sconce 54. In some embodiments, the wall plate adapter 130 may be implemented with different designs to support a left or a right side placement of the security camera 104.

The functions performed by the diagrams of FIGS. 1-23 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application. The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
   a power adapter configured to (i) receive an AC power source, (ii) pass through said AC power source to a light bulb in a light fixture separate from said apparatus and (iii) generate DC power by converting said AC power source;
   a security camera portion (i) configured to receive said DC power from said power adapter and (ii) comprising a camera module; and
   a base comprising (i) an opening configured to enable wiring from said light fixture to pass through said opening and form a connection with a supply wire for said AC power source and a wire for said power adapter and (ii) an extendable portion, wherein
   (i) said power adapter receives said AC power source from said supply wire,
   (ii) said security camera portion is configured to receive said DC power from said power adapter,
   (iii) said security camera portion is attached to said extendable portion and
   (iv) said extendable portion is configured to retract into said base and extend out of said base to adjust a distance of said camera module from said base such that a field of view of said camera module is not obstructed by said light fixture.

2. The apparatus according to claim 1, wherein said extendable portion comprises a pair of arms connected to each side of said security camera portion.

3. The apparatus according to claim 2, wherein said pair of arms enable low voltage wires to connect from said power adapter implemented in said base to said security camera portion to provide said DC power.

4. The apparatus according to claim 1, wherein said distance is zero when said extendable portion is retracted within said base.

5. The apparatus according to claim 1, wherein said power adapter and a speaker are implemented within said base.

6. The apparatus according to claim 1, wherein said extendable portion is configured to be extended downwards from said base to enable said camera module to be located below said base and said light fixture.

7. The apparatus according to claim 1, wherein said extendable portion is configured to be extended upwards from said base to enable said camera module to be located above said base and said light fixture.

8. The apparatus according to claim 1, wherein said camera module is configured to rotate left and right and tilt forwards and backwards.

9. The apparatus according to claim 8, wherein (i) said security camera portion comprises a ridge, (ii) said ridge enables said camera module to hang at an offset in front of said security camera portion and (iii) said offset enables said camera module to have sufficient room to rotate and tilt.

10. The apparatus according to claim 1, further comprising a bracket configured to securely attach to a wall.

11. The apparatus according to claim 10, wherein said security camera portion is configured to securely connect to said bracket.

12. The apparatus according to claim 10, wherein (i) said extendable portion is extended to said distance, (ii) said bracket is attached to said wall at said distance, (iii) said security camera portion is secured to said bracket and (iv) said bracket prevents said security camera portion from being moved.

13. The apparatus according to claim 1, wherein (i) said base further comprises a bubble level, (ii) said bubble level provides an indication that said base is mounted horizontally level to a wall and (iii) said bubble level is located near said opening to enable said light fixture to cover said bubble level after installation.

14. The apparatus according to claim 1, wherein a maximum amount of said distance is 10.5 inches.

15. The apparatus according to claim 1, wherein (i) said security camera portion further comprises a video processor and (ii) said video processor is configured to perform video analysis on video frames captured by said camera module to recognize objects.

16. The apparatus according to claim 1, wherein said security camera portion comprises a video processor, a microphone and a wireless communication device.

17. The apparatus according to claim 1, wherein (i) said base further comprises mounting locations, (ii) said mounting locations enable said light fixture to be attached to said base and (iii) said mounting locations are located near said opening to enable said light fixture and said base to be attached to a junction box that provides said supply wire for said AC power source.

18. The apparatus according to claim 1, wherein (i) said security camera portion further comprises a motion sensor and (ii) said motion sensor is configured to move along with said camera module as said distance is adjusted.

19. An apparatus comprising:
   a power adapter configured to (i) receive an AC power source, (ii) pass through said AC power source to a light bulb and (iii) generate DC power by converting said AC power source;
   a security camera portion (i) configured to receive said DC power from said power adapter and (ii) comprising a camera module; and
   a base comprising (i) an opening for a light fixture and (ii) extendable portions, wherein
   (i) said power adapter receives said AC power source from an electrical connection for said light fixture,
   (ii) said security camera portion is configured to receive said DC power from said power adapter,
   (iii) said security camera portion is attached to said extendable portions,
   (iv) said extendable portions are configured to retract into said base and extend out of said base to adjust a distance of said camera module from said base such that a field of view of said camera module is not obstructed by said light fixture and
   (v) said distance is zero when said extendable portions are retracted within said base.

20. An apparatus comprising:
a power adapter configured to (i) receive an AC power source, (ii) pass through said AC power source to a light bulb and (iii) generate DC power by converting said AC power source;
a security camera portion (i) configured to receive said DC power from said power adapter and (ii) comprising a camera module; and
a base comprising (i) an opening for a light fixture and (ii) extendable portions, wherein
  (i) said power adapter receives said AC power source from an electrical connection for said light fixture,
  (ii) said security camera portion is configured to receive said DC power from said power adapter,
  (iii) said security camera portion is attached to said extendable portions,
  (iv) said extendable portions are configured to retract into said base and extend out of said base to adjust a distance of said camera module from said base such that a field of view of said camera module is not obstructed by said light fixture and
  (v) a maximum amount of said distance is 10.5 inches.

* * * * *